United States Patent [19]

Nagano

[11] Patent Number: 5,793,726
[45] Date of Patent: Aug. 11, 1998

[54] REPRODUCTION SYSTEM FEATURING AUTOMATIC SELECTION AMONG MULTIPLE REPRODUCTION MODES

[75] Inventor: Shuichi Nagano, Kanagawa, Japan

[73] Assignee: Sony Corporation, Tokyo, Japan

[21] Appl. No.: 666,362

[22] PCT Filed: Oct. 24, 1995

[86] PCT No.: PCT/JP95/02184

§ 371 Date: Aug. 27, 1996

§ 102(e) Date: Aug. 27, 1996

[87] PCT Pub. No.: WO96/13035

PCT Pub. Date: May 2, 1996

[30] Foreign Application Priority Data

Oct. 24, 1994 [JP] Japan .................. 6-282405

[51] Int. Cl.$^6$ ................................. G11B 27/02
[52] U.S. Cl. .................... 369/47; 369/32; 369/58
[58] Field of Search ..................... 369/47, 48, 58, 369/32, 54, 41; 360/48

[56] References Cited

U.S. PATENT DOCUMENTS

| | | | |
|---|---|---|---|
| 5,051,973 | 9/1991 | Shiba et al. | 369/36 |
| 5,237,553 | 8/1993 | Fukushima et al. | 369/58 |
| 5,285,437 | 2/1994 | Yokota | 369/64 |
| 5,544,130 | 8/1996 | Mizuno et al. | 369/1 |
| 5,613,109 | 3/1997 | Yamauci et al. | 395/615 |
| 5,638,346 | 6/1997 | Aramaki | 369/32 |

FOREIGN PATENT DOCUMENTS

| | | |
|---|---|---|
| 2-71483 | 3/1990 | Japan . |
| 3-290867 | 12/1991 | Japan . |
| 6-89547 | 3/1994 | Japan . |

*Primary Examiner*—Thang V. Tran
*Attorney, Agent, or Firm*—Frommer Lawrence & Haug LLP; William S. Frommer

[57] ABSTRACT

A video CD has a program area having plural recorded programs and a managemental area in which alternatives for selecting the programs in reproducing the programs are recorded as the managemental information. In the managemental area is pre-recorded an identifier for determining the program reproducing mode as the managemental information. An optical head 34 reproduces the programs from the program area of the video CD, while reproducing the managemental information from the managemental area. A system controller 53 judges the reproducing mode based upon the identifier included in the managemental information and, based upon the judged reproducing mode, selects an alternative based upon the random number if the reproducing mode is the random reproduction mode. The system controller 53 controls the optical head 34 and the servo circuit 37 for reproducing the program associated with the alternative. The audio data of the reproduced program is decoded by am MPEG audio decoder 40 and outputted after conversion into audio signals by a D/A converter 45. The video data is decoded by a video decoder 42 and outputted after conversion into video signals by the D/A converter 47.

9 Claims, 26 Drawing Sheets

STRUCTURE OF PVD
(BASIC VOLUME DESCRIPTOR)

| BYTE POSITION | BYTE SIZE | CONTENTS |
|---|---|---|
| 2 | 5 | VOLUME STRUCTURE STANDARD ID |
| 9 | 32 | SYSTEM IDENTIFIER |
| 41 | 32 | VOLUME IDENIFIER |
| 123 | 2 | NUMBER OF VOLUMES IN ALBUM |
| 127 | 2 | ALBUM SET SEQUENCE NUMBER |
| 131 | 2 | LOGICAL BLOCK SIZE |
| 137 | 4 | PASS TABLE |
| 141 | 8 | PASS TABLE ADDRESS |
| 157 | 34 | ROUTE DIRECTORY RECORD |
| 191 | 128 | ALBUM IDENTIFIER |
| 319 | 128 | PUBLISHER IDENTIFIER |
| 447 | 128 | AUTHOR IDENTIFIER |
| 575 | 128 | APPLICATION IDENTIFIER |
| 703 | 32 | COPY RIGHT FILE NAME |
| 740 | 32 | SUMMARY FILE NAME |
| 777 | 32 | CATALOG FILE NAME |
| 814 | 16 | PREPARATION DATE |
| 831 | 16 | CORRECTION DATE |
| 848 | 16 | DUE DATE |
| 865 | 16 | EFFECTIVE DATE |
| 882 | 1 | FILE STRUCTURE STANDARD VERSION NUMBER |
| 1025 | 26 | XA LABEL RECORD |

| | |
|---|---|
| PHYSICAL FORMAT | CD-ROM(XA) |
| DIGITAL VIDEO | PURSUANT TO MPEG1<br><br>PIXEL SIZE (NUMBER OF PIXELS) / FRAME FREQUENCY :<br>   352 × 240/29.97Hz(NTSC)<br>   352 × 240/23.976Hz(FILM)<br>   352 × 288/25Hz(PAL)<br><br>DATA TRANSFER SPEED :<br>   MAX. 1.152Mbits/sec |
| DIGITAL AUDIO | MPEG1LAYER2<br>SAMPLING FREQUENCY : 44.1kHz<br>DATA TRANSFER RATE : 224kbits/sec (TRACK2 ff.)<br>64, 96, 128, 192, 224, 384kbits/sec (TRACK1) |
| PLAYBACK TIME | MAX. 74 MINUTES |
| NUMBER OF PIXELS OF STILL PICTURE | STANDARD LEVEL : 352×240 (NTSC)<br>                     352×288 (PAL)<br>HIGH DEFINITION LEVEL : 704×480 (NTSC)<br>                            704×576 (PAL) |
| PLAYBACK DESIGN STATEMENT | NORMAL PLAYBACK, SLOW, PAUSE ETC.<br>MENU REPRODUCTION EMPLOYING PLAYBACK CONTROL |
| VIDEO SIGNAL OUTPUT | NTSC/PAL |
| FIELD OF APPLICATION | MOTION PICTURE, KARAOKE, MUSIC, EDUCATION, PHOTO ALBUM ETC. |

FIG.1

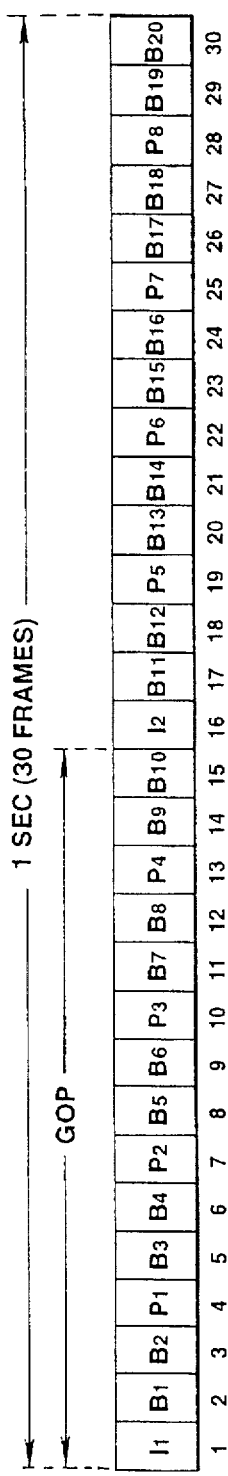
FIG.3A
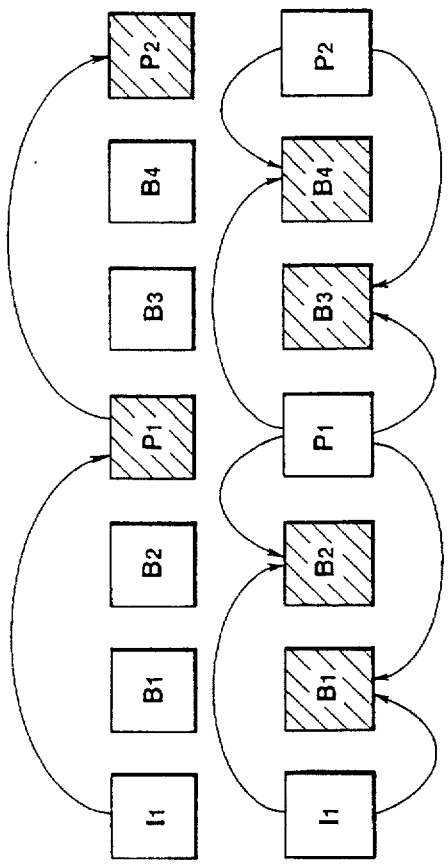
FIG.3B
FIG.3C
FIG.3D
FIG.3E

BASIC CONSTRUCTION OF SECTOR

EXAMPLE OF VIDEO SECTOR

EXAMPLE OF AUDIO SECTOR

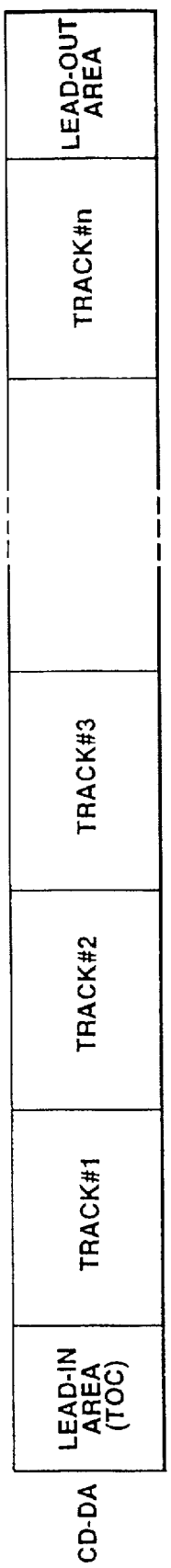
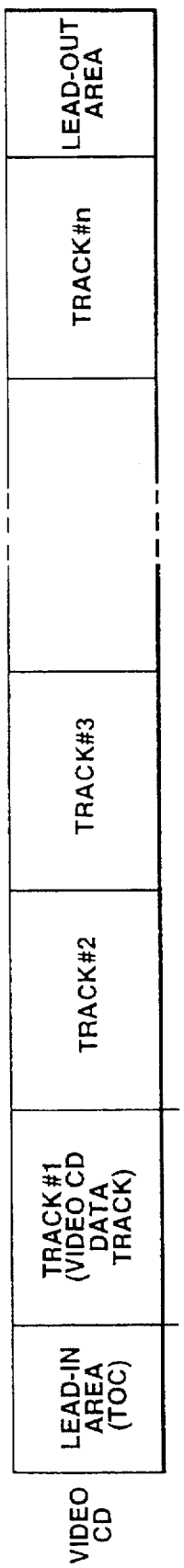
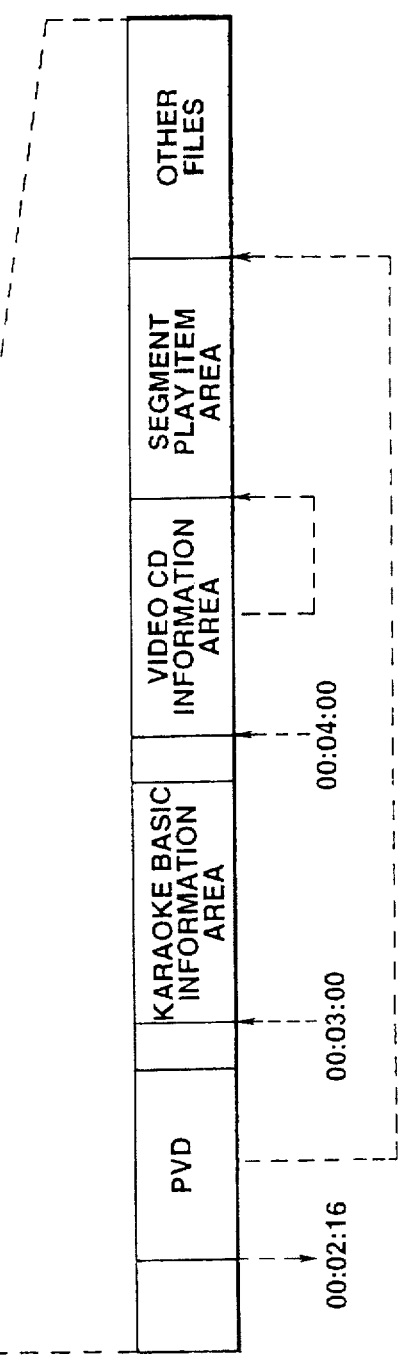
FIG.6A
FIG.6B

TOC CONSTRUCTION
(EXAMPLE OF 6-TRACK DISC)

| TNO | BLOCK | POINT | PMIN, PSEC, PFRAME | |
|---|---|---|---|---|
| 00 | | 01 | 00:02:32 | |
| | n+1 | 01 | 00:02:32 | START POINT FOR TRACK #1 |
| | n+2 | 01 | 00:02:32 | |
| | n+3 | 02 | 10:15:12 | |
| | n+4 | 02 | 10:15:12 | START POINT FOR TRACK #2 |
| | n+5 | 02 | 10:15:12 | |
| | n+6 | 03 | 16:28:63 | |
| | n+7 | 03 | 16:28:63 | START POINT FOR TRACK #3 |
| | n+8 | 03 | 16:28:63 | |
| | n+9 | 04 | • • | |
| | n+10 | 04 | • • | |
| | n+11 | 04 | • • | |
| | n+12 | 05 | • • | |
| | n+13 | 05 | • • | |
| | n+14 | 05 | • • | |
| | n+15 | 06 | 19:10:03 | |
| | n+16 | 06 | 19:10:03 | START POINT FOR TRACK #6 |
| | n+17 | 06 | 19:10:03 | |
| | n+18 | A0 | 01:20:00 | |
| | n+19 | A0 | 01:20:00 | TRACK NUMBER OF FIRST TRACK OF DISC |
| | n+20 | A0 | 01:20:00 | |
| | n+21 | A1 | 06:00:00 | |
| | n+22 | A1 | 06:00:00 | TRACK NUMBER OF FIRST TRACK OF DISC |
| | n+23 | A1 | 06:00:00 | |
| | n+24 | A2 | 52:48:41 | |
| | n+25 | A2 | 52:48:41 | START POINTT OF LEAD-OUT TRACK |
| 00 | n+26 | A2 | 52:48:41 | |
| 00 | n+27 | 01 | 00:02:31 | |
| | n+28 | 01 | 00:02:32 | |
| | • | • | • • | |

FIG.10

STRUCTURE OF PVD
(BASIC VOLUME DESCRIPTOR)

| BYTE POSITION | BYTE SIZE | CONTENTS |
|---|---|---|
| 2 | 5 | VOLUME STRUCTURE STANDARD ID |
| 9 | 32 | SYSTEM IDENTIFIER |
| 41 | 32 | VOLUME IDENIFIER |
| 123 | 2 | NUMBER OF VOLUMES IN ALBUM |
| 127 | 2 | ALBUM SET SEQUENCE NUMBER |
| 131 | 2 | LOGICAL BLOCK SIZE |
| 137 | 4 | PASS TABLE |
| 141 | 8 | PASS TABLE ADDRESS |
| 157 | 34 | ROUTE DIRECTORY RECORD |
| 191 | 128 | ALBUM IDENTIFIER |
| 319 | 128 | PUBLISHER IDENTIFIER |
| 447 | 128 | AUTHOR IDENTIFIER |
| 575 | 128 | APPLICATION IDENTIFIER |
| 703 | 32 | COPY RIGHT FILE NAME |
| 740 | 32 | SUMMARY FILE NAME |
| 777 | 32 | CATALOG FILE NAME |
| 814 | 16 | PREPARATION DATE |
| 831 | 16 | CORRECTION DATE |
| 848 | 16 | DUE DATE |
| 865 | 16 | EFFECTIVE DATE |
| 882 | 1 | FILE STRUCTURE STANDARD VERSION NUMBER |
| 1025 | 26 | XA LABEL RECORD |

FIG.12

DISC INFORMATION STRUCTURE IN VIDEO CD INFORMATION AREA

| BYTE POSITION | BYTE SIZE | CONTENTS |
| --- | --- | --- |
| 1~8 | 8 | SYSTEM IDENTIFIER |
| 9~10 | 2 | VERSION NUMBER |
| 11~26 | 16 | ALBUM IDENTIFIER |
| 27~28 | 2 | NUMBER OF VOLUMES IN ALBUM |
| 29~30 | 2 | ALBUM SET SEQUENCE NUMBER |
| 31~43 | 13 | SIZE MAP OF MOTION PICTURE TRACK |
| 44 | 1 | STATUS FLAG |
| 45~48 | 4 | PSD SIZE |
| 49~51 | 3 | FIRST SEGMENT ADDRESS |
| 52 | 1 | OFFSET MULTIPLIER |
| 53~54 | 2 | NUMBER OF LIST ID |
| 55~56 | 2 | NUMBER OF SEGMENT PLAY ITEM |
| 57~2036 | 1980 | SEGMENT PLAY ITEM CONTENTS TABLE |
| 2037~2048 | 12 | RESERVE |

FIG.14

LIST ID OFFSET TABLE
(NUMBER OF LIST ID=n)

SECTOR ADDRESS

| | | | |
|---|---|---|---|
| 00 : 04 : 02 | START-UP OFFSET | 0000h | 2 BYTES |
| | LIST ID1 OFFSET | 0000h | 2 BYTES |
| | LIST ID2 OFFSET | ****h | 2 BYTES |
| 32 SECTORS | ⋮ | ⋮ | |
| | LIST IDn OFFSET | ****h | 2 BYTES |
| | NON-USE LIST ID | FFFFh | 2 BYTES |
| | ⋮ | | |
| 00 : 04 : 33 | NON-USE LIST ID | FFFFh | 2 BYTES |

FIG.16

PLAY LIST

| | |
|---|---|
| PLAY LIST HEADER | 1 BYTE |
| NUMBER OF ITEM | 1 BYTE |
| LIST ID NUMBER | 2 BYTES |
| PREVIOUS LIST OFFSET | 2 BYTES |
| NEXT LIST OFFSET | 2 BYTES |
| RETURN LIST OFFSET | 2 BYTES |
| PLAYING TIME | 2 BYTES |
| PLAY ITEM WAIT TIME | 1 BYTE |
| AUTO PAUSE WAIT TIME | 1BYTE |
| PLAY ITEM #1 NUMBER (PIN=1) | 2 BYTES |
| ⋮ | ⋮ |
| PLAY ITEM #N NUMBER (PIN=N) | 2BYTES |

FIG.17

DEFINITION OF
PLAY ITEM NUMBER

| PLAY ITEM NUMBER (PIN) | MEANING |
|---|---|
| PIN = 0 OR 1 | REPRODUCE NOTHING |
| PIN = 2~99 | REPRODUCE TRACK AMONG TRACKS #2 TO #99 SPECIFIED BY PIN |
| PIN = 100~599 | REPRODUCE FROM ENTRY POINT SPECIFIED BY ENTRY TABLE (PIN-100) |
| PIN = 600~999 | NOT DEFINED |
| PIN = 1000~2979 | REPRODUCE SEGMENT PLAY ITEM SPECIFIED BY (PIN-999) AMONG SEGMENT PLAY ITEMS #1 TO #1980 |
| PIN = 2980~65535 | NOT DEFINED |

FIG.18

SELECTION LIST

| SELECTION LIST HEADER | 1 BYTE |
|---|---|
| UNUSED | 1 BYTE |
| NUMBER OF ALTERNATIVES (NOS) | 1 BYTE |
| NUMBER OF FIRST ALTERNATIVE (BSN) | 1 BYTE |
| LIST ID NUMBER | 2 BYTES |
| PREVIOUS LIST OFFSET | 2 BYTES |
| NEXT LIST OFFSET | 2 BYTES |
| RETURN LIST OFFSET | 2 BYTES |
| DEFAULT LIST OFFSET | 2 BYTES |
| TIMEOUT LIST OFFSET | 2 BYTES |
| WAIT TIME UNTIL TIMEOUT | 1 BYTE |
| LOOP COUNT AND JUMP TIMING | 1 BYTE |
| PLAY ITEM NUMBER (PIN) | 2 BYTES |
| SELECTION #BSN OFFSET | 2 BYTES |
| ⋮ | ⋮ |
| SELECTION #(BSN+NOS-1) OFFSET | 2 BYTES |

FIG.19

DEFINITION OF WAIT TIME
UNTIL TIMEOUT

| WAIT TIME VALUE | WAIT TIME |
|---|---|
| 0 | NO STAND-BY |
| 1~60 | 1~60 SECONDS |
| 61 | 70 SECONDS |
| 62 | 80 SECONDS |
| ⋮ | ⋮ |
| n | (n-60) 10+60 SECONDS |
| ⋮ | ⋮ |
| FEh | 200 SECONDS (32 MINUTES 20 SECONDS) |
| FFh | WAIT FOR INPUT |

FIG.20

FIG. 28A
BIT MAP FOR SECTION LIST S1

| LIST ID | Sel#1 | Sel#2 | Sel#3 | Sel#4 | Sel#5 | Sel#6 | Sel#7 | ... | Sel#99 |
|---|---|---|---|---|---|---|---|---|---|
| 0001 | | | | | | | | | |

FIG. 28B
INITIALIZE

| LIST ID | Sel#1 | Sel#2 | Sel#3 | Sel#4 | Sel#5 | Sel#6 | Sel#7 | ... | Sel#99 |
|---|---|---|---|---|---|---|---|---|---|
| 0001 | 1 | 1 | 1 | 1 | 1 | 0 | 0 | | 0 |

FIG. 28C
SELECT Sel#2

| LIST ID | Sel#1 | Sel#2 | Sel#3 | Sel#4 | Sel#5 | Sel#6 | Sel#7 | ... | Sel#99 |
|---|---|---|---|---|---|---|---|---|---|
| 0001 | 1 | 0 | 1 | 1 | 1 | 0 | 0 | | 0 |

FIG. 28D
SELECT Sel#4

| LIST ID | Sel#1 | Sel#2 | Sel#3 | Sel#4 | Sel#5 | Sel#6 | Sel#7 | ... | Sel#99 |
|---|---|---|---|---|---|---|---|---|---|
| 0001 | 1 | 0 | 1 | 0 | 1 | 0 | 0 | | 0 |

FIG. 28E
TIME POINT OF SELECTION OF ALL SELECTIONS

| LIST ID | Sel#1 | Sel#2 | Sel#3 | Sel#4 | Sel#5 | Sel#6 | Sel#7 | ... | Sel#99 |
|---|---|---|---|---|---|---|---|---|---|
| 0001 | 0 | 0 | 0 | 0 | 0 | 0 | 0 | | 0 |

REPRODUCTION SYSTEM FEATURING AUTOMATIC SELECTION AMONG MULTIPLE REPRODUCTION MODES

TECHNICAL FIELD

This invention relates to a reproducing apparatus and a reproducing method for reproducing a program, such as audio data or video data, from a recording medium, and the recording medium. More particularly, it relates to a recording medium, compact disc (CD) or a video CD, having the program reproducing sequences previously recorded thereon, and a reproducing apparatus and a reproducing method for reproducing video data or audio data from the recording medium.

BACKGROUND ART

A wide variety of play-only (so-called ROM) type disc-shaped recording media, such as CD-DA (CD-digital audio), have become widespread. With the CD-DA, audio signals are digitized and recorded as audio data so as to be reproduced in order to enable the music or the like to be enjoyed wt a high sound quality. As a sort of this CD-DA, there has also been known a CD-G (CD-graphic) in which still picture data is recorded in a so-called sub-code data. There has also been developed a video CD, as a sort of the CD-ROM, in which moving picture data (video data) has been recorded as audio data.

Some of the video CDs have the so-called playback control function. The playback control controls the reproducing operation of a program, such as audio data or video data, using the list information pre-recorded on the video CD, and realizes a simplified interactive reproduction.

Specifically, mainly the selection list and the play list are recorded as the list information in the video CD. These lists are of a layered structure. The selection list is reproduced from the video CD and the menu based upon the selection list is displayed on a screen of the display section. The user then performs the selecting operation responsive to the menu screen and selects the play list which is a portion of the selection list. In the play list, there is stated the program to be reproduced, such as track numbers. When the play list is selected, the reproducing device reproduces the program stated in the play list. Basically, by such operation, the video CD may be utilized as a software of the type that permits conversation with the user.

Meanwhile, if a menu is displayed by this playback control on the screen, the user occasionally does not perform any selective operation responsive to the displayed menu. In anticipation of such case, the wait time is set in the selection list. Besides, there is recorded therein an operation which should be executed when the wait time has elapsed without any operation being performed. That is, if the time has elapsed without any operation being performed, a particular alternative (program) in the selection list may be executed automatically.

There is also known a reproducing apparatus for reproducing a CD (CD player) having a random number generator, so that, when the user presses an operating button commanding random reproduction, the program of a number corresponding to the random number generated by the random number generator is reproduced.

However, the random reproduction is performed by the user's instruction, that is, it is not performed automatically. Thus, if random reproduction is to be performed in an exhibition of products or a demonstration at a retail store, the user has to press the operating button each time random reproduction is made, which inconveniences the user.

On the other hand, the random numbers generated by the random number generator are not necessarily different but the same value may be generated on end, while the random numbers may be generated in the same sequence for the first run of random numbers and the second run of random numbers, thus giving no fascinating reproducing sequence.

In view of the above-mentioned problem of the prior art, it is an object of the present invention to provide a recording medium on which is recorded not only the program of audio data or video data but also the descriptor or identifier commanding a playback mode of continuous program reproduction or random program reproduction.

It is another object of the present invention to provide a reproducing apparatus and a reproducing method whereby the descriptor or identifier is reproduced from a recording medium for automatically performing random reproduction and whereby the same program may be prohibited from being reproduced twice or more in the course of random reproduction.

DISCLOSURE OF THE INVENTION

A reproducing apparatus for program reproduction from a recording medium according to the present invention has a program area having a plurality of programs recorded therein and a managemental area having recorded therein program selecting alternatives for selecting the programs in reproducing the programs, as the managemental information. The managemental area of the recording medium has an identifier for determining the program reproducing mode pre-recorded therein as the managemental information. The reproducing apparatus includes reproducing means for reproducing the program from the program area of the recording medium and for reproducing the managemental information from the managemental area, judgment means for judging the reproducing mode based upon the identifier included in the managemental information reproduced by the reproducing means, random number generating means for generating the random number, selection means for selecting the alternatives based upon the random number from the random number generating means if the reproducing mode judged by the judgment means is the random reproduction, and control means for controlling the reproducing means for reproducing the program associated with the alternative selected by the selection means.

A reproducing apparatus for program reproduction from a recording medium according to the present invention similarly has a program area having a plurality of programs recorded therein and a managemental area having recorded therein program selecting alternatives for selecting the programs in reproducing the programs. The managemental area of the recording medium has an identifier for determining the program reproducing mode and the limit time pre-recorded therein. The reproducing apparatus includes reproducing means for reproducing the programs from the program area of the recording medium and for reproducing the managemental information from the managemental area, time measurement means for measuring the limit time included in the managemental information reproduced by the reproducing means, judgement means for judging the reproducing mode based upon the identifier included in the managemental information when the limit time of the time measurement means exceeds the limit time, random number generating means for generating the random number, selection means for selecting the alternatives based upon the random number from the random number generating means if the reproducing mode judged by the judgment means is the random reproduction, and control means for controlling the reproducing means for reproducing the program associated with the alternative selected by the selection means.

A reproducing method for program reproduction from a recording medium according to the present invention has a program area having a plurality of programs recorded therein and a managemental area having recorded therein program selecting alternatives for selecting the programs in reproducing the programs, as the managemental information. The managemental area of the recording medium has an identifier for determining the program reproducing mode pre-recorded therein as the managemental information. The reproducing method includes the steps of reproducing the managemental information from the managemental area and judging the reproducing mode based upon the identifier included in the managemental information, selecting an alternative based upon the generated random number if the reproducing mode is judged to be a random reproduction in the judgment step, and reproducing the program associated with the alternative selected by the selecting step.

A reproducing method for program reproduction from a recording medium according to the present invention similarly has a program area having a plurality of programs recorded therein and a managemental area having recorded therein program selecting alternatives for selecting the programs in reproducing the programs. The managemental area of the recording medium has an identifier for determining the program reproducing mode and the limit time pre-recorded therein. The reproducing method includes the steps of reproducing the managemental information from the managemental area and comparing the limit time included in the management information to a count value of a counter, judging the reproducing mode based upon the identifier included in the managemental information if the count value is found in the comparison step to have exceeded the limit time, selecting an alternative based upon the generated random number if the reproducing mode is judged to be a random reproduction in the judgment step, and reproducing the program associated with the alternative selected by the selecting step.

A recording medium according to the present invention has a program area having a plurality of programs recorded therein and a managemental area for managing these plural programs, wherein an identifier for identifying whether continuous reproduction or random reproduction based upon random numbers is to be performed by way of program reproduction.

According to the present invention, a program is to be reproduced from a recording medium having a program area having a plurality of programs recorded therein and a managemental area having program selecting alternatives for selecting the programs in reproducing the recorded programs. In the managemental area of the recording medium is pre-recorded a identifier for determining the program reproducing mode. The managemental information is reproduced from the managemental area and the reproducing mode is judged based upon the identifier included in the managemental information. If the reproducing mode is judged to be the random reproduction, an alternative is selected based upon the generated random number, and the program corresponding to the selected alternative is reproduced.

According to the present invention, a program is to be reproduced from a recording medium having a program area having a plurality of programs recorded therein and a managemental area having program selecting alternatives for selecting the programs in reproducing the recorded programs. In the managemental area of the recording medium, there are pre-recorded an identifier for determining the program reproducing mode and the limit time. The managemental information is reproduced from the managemental area. The limit time included in the managemental information and the count value of a counter are compared to each other. If the count value exceeds the limit time, the reproducing mode is judged based upon the identifier included in the managemental information. If the reproducing mode is judged to be the random reproduction, an alternative is selected based upon the generated random number and the program associated with the selected alternative is reproduced.

BRIEF DESCRIPTION OF THE DRAWINGS

FIG. 1 illustrates the format of XA design specifications for a CD-ROM.

FIGS. 3A, 3B, 3C, 3D, and 3E illustrate video data of a video CD.

FIGS. 6A and 6B illustrate a construction on a disc of a video CD.

FIG. 10 illustrates TOC data.

FIG. 12 illustrates a PVD of the video CD.

FIG. 14 illustrates the disc information of the video CD.

FIG. 16 illustrates a list ID offset table of the video CD.

FIG. 17 illustrates a play list of the video CD.

FIG. 18 illustrates the play item number of the video CD.

FIG. 19 illustrates a selection list of the video CD.

FIG. 20 illustrates the wait time until timeout of the video CD.

FIGS. 28A, 28B, 28C, 28D and 28E illustrate a bit map for random designation employed in the random selecting operation of the reproducing apparatus shown in FIG. 23.

BEST MODE FOR CARRYING OUT THE INVENTION

Figure 2:
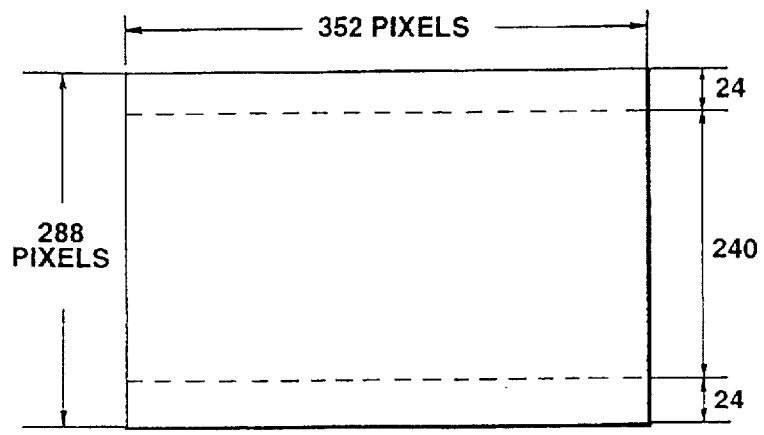
FIG. 2 illustrates a picture size of a video CD.

Referring to the drawings, preferred embodiments of the reproducing method and apparatus and the recording medium according to the present invention will be explained in detail.

In the present embodiment, the present invention is applied to a reproducing apparatus for reproducing audio data or video data from e.g., a compact digital audio (CD-DA), CD-G or video CD. The reproducing apparatus has the so-called playback control (PBC) function for the video CD.

The description is made in the following sequence:

I. Data Construction of video CD
  1. Data Configuration
     a. Video Data
     b. Audio Data
     c. Management Data
  2. Track Structure
  3. Sector Construction
  4. Arrangement on Disc
  5. TOC and Sub-code
  6. Directory Construction
  7. Video CD Data Track
     a. Primary Volume Descriptor (PVC)
     b. Video CD Data Track
        b1. Disc Information
        b2. Entry Table
        b3. List ID Offset Table
        b4. Play Sequence Descriptor
          Play List
          Selection List
          End List
     c. Segment Play Item
II. Playback Control
  1. List Construction
  2. Illustrative Example
III. Illustrative Construction of Reproducing Apparatus
  1. Appearance
  2. Specific Circuit Construction
IV. Random Reproducing Operation during PBC Operation

I. Data Construction of video CD

1. Data Configuration

The standard for the video CD describes that video data or audio data encoded using the Moving Picture Experts Group (MPEG) standardized as the high efficiency encoding technique be recorded for 60 minutes or longer on an optical disc in accordance with the so-called CD-ROM format and the recorded audio data or video data is reproduced from the disc for outputting the video and audio signals of the moving picture. Thus the optical disc of the video CD standard becomes useful as the household software for music, motion picture or karaoke while being able to cope with the software for education, electronic publication software or game software in combination with still pictures.

The video CD standard prescribes that moving picture data be encoded (compressed) in accordance with the MPEG system, while audio data is encoded with a compression ratio of approximately one-sixth of 1.4 Mbps for the usual CD-ROM format, that is 22.4 kbps, for time-divisional multiplexed recording of the audio data and the video data on the optical disc. In addition, managemental data required for reproduction is recorded in a prescribed region.

a. Video Data

FIG. 1 shows the CD-ROM XA format in the video CD. As the recording format for video and audio data, 1.152 Mbits/sec and 64 to 384 kbp/sec are allocated for the video data and for the audio data, respectively, as shown in FIG. 1. The number of pixels of the video data is 352×240 for video signals of the National Television System Committee (NTSC system) (29.97 Hz) and for a film (23.976 Hz), and 352×288 for video signals of the Phase Alternation by Line (PAL) System (25 Hz).

On the other hand, the number of pixels for a still picture for the NTSC system is 352×240 and 704×480 for the standard level and for the high definition level, respectively, while that for the PAL system is 352×288 and 704×576 for the standard level and for the high definition level, respectively.

The manner of encoding of video data (moving picture data) in accordance with the MPEG system for data compression is as follows: Assuming that the pre-compression video signals are of the NTSC system, these video signals are constituted by video signals of 30 frames/sec (or 60 field/sec) video signals.

With the MPEG system, video data of e.g., one frame, i.e., one picture, is divided into 22 blocks in the horizontal direction and 15 blocks in the vertical direction, totalling 330 blocks. The video data of the respective blocks is transformed by discrete cosine transform (DCT) and re-quantized for diminishing the number of bits with high-frequency components of the DCT coefficients being set to zero. The DCT coefficients of the respective blocks are re-arrayed in a zig-zag fashion, beginning from the DCT coefficients lying at an upper left end of the screen, and are encoded by run-length coding for further diminishing the number of bits.

In the case of pictures of the encoded video signals, picture signals of pictures temporarily forward and backward a given picture exhibit strong correlation. With the MPEG system, this correlation is utilized for further compressing the information volume. The MPEG system provides three picture types having different degrees of picture compression. These three pictures are termed an intra-coded picture (I-picture), a predictive-coded picture (P-picture) and a bi-directional predictive-coded picture (B-picture).

In general, thirty frames (pictures) present in one second are arrayed as the I-, P- and B-pictures, as shown for example in FIG. 3A. Specifically, I-pictures I1 and I2 are arranged every 15 frames, while eight P-pictures P1 to P8 and twenty B-pictures B1 to B20 are also arranged. The domain from a given I-picture to the next I-picture is termed a group-of-picture or GOP.

The picture data of the I-picture are generated by DCT of picture data in the picture followed by encoding.

The picture data of the P-picture are generated by motion compensated encoding based upon the P-picture or I-picture closest thereto. For example, the picture data of the P-picture P1 and the picture data of the P-picture P2 are generated based upon the I-picture I1 and the P-picture P1, respectively, as shown in FIG. 3B. Thus the P-picture is compressed to a higher degree than the I-picture. Meanwhile, since the P-picture is formed based upon sequentially temporally forward I- or P-picture, any error produced in the temporally forward basic picture is propagated to the next following pictures.

The picture data of the B-picture are generated by motion-compensated predictive coding based upon both past and future I-or P-pictures. For example, the picture data of the B-pictures B1 and B2 are generated based upon the I-picture I1 and the P-picture P1, whole the picture data of the B-pictures B3 and B4 are generated based upon the P-pictures P1 and P3. The B-picture is compressed to the utmost extent among the three picture sorts. Since the B-picture is not used as reference for the remaining pictures, there is no risk of error propagation.

The MPEG algorithm allows for free selection of the positions and periods of the I-pictures on the part of the manufacturer in view of various circumstances such as random accessing or scene cutting. If emphasis is placed on random accessing, at least two I-pictures are required in one second, a shown in FIG. 3A.

The frequency of occurrence of the P- and B-pictures may be selected freely in dependence upon e.g., the memory capacity of an encoder configured for encoding the video data in accordance with the MPEG system.

The encoder in the MPEG system is configured for re-arraying a bitstream of picture data for increasing the decoding efficiency in the decoder before outputting the bitstream. For example, the sequence of the frames to be displayed (decoder outputting sequence) is the sequence of the frame numbers, as shown in a lower part of FIG. 3A. However, in order for the decoder to re-synthesize a B-picture, the temporally backward P-picture, as a reference picture, is required at the time point of decoding of the B-picture. Thus the encoder re-arrays the frame sequence shown in FIG. 3D so that the P-picture P1 lies ahead of the B-picture B1, and the resulting picture array is transmitted as a bitstream of the picture data, as shown for example in FIG. 3E.

b. Audio Data

The MPEG audio data format accommodates a wide range of the encoding rates ranging from 32 kbit/sec to 44 kbit/sec. However, for ease in preparation of the software and improvement in the sound quality, the encoding rate for moving pictures for tracks #2 ff. is set to 224 kbit/sec. The sampling frequency is 44.1 kHz, as in the case of the CD-DA.

c. Managemental Data

In addition to the programs for video data and audio data, managemental data managing control of various control operations for the reproducing operations are recorded on the video CD.

That is, as in the case of the CD-DA, the table-of-contents (TOC) and the sub-code are recorded for specifying e.g., the number of tracks (programs) and the absolute time specifying the start position of each track.

With the video CD, the track #1 is used as a video CD data track for recording various managemental information items, as will be explained subsequently. The playback control operation as later explained is also implemented using data present in the video CD data tracks. These managemental data will be explained subsequently.

2. Track Structure

Figure 4:
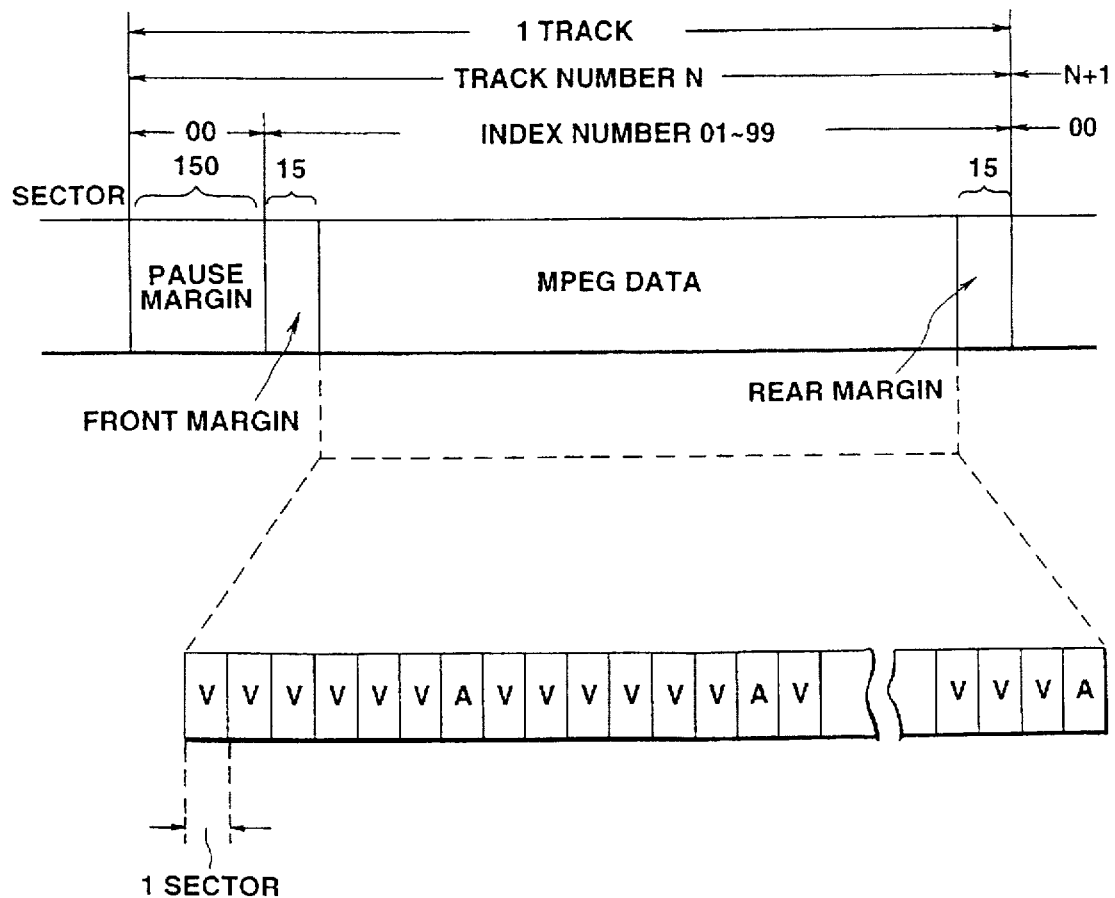
FIG. 4 illustrates a track structure of a video CD.

FIG. 4 shows the data structure of a track on which is recorded program-based video data and audio data of e.g., a motion picture.

In anticipation of a retrieval by a track number, as in the case of the CD-DA, a 150-sector pause margin is provided at the leading end of the track. The pause margin is followed by a 15-sector front margin. The last 15 sectors of the track constitute a rear margin, which is a vacant data region.

The space between the front margin and the rear margin is the MPEG data region in which is recorded data encoded in accordance with the encoding rule consistent with the MPEG system. In the MPEG region are arrayed sectors V having video data recorded therein and sectors A having audio data recorded therein at a ratio of 6:1 on an average, as shown in FIG. 4. That is, the interleaved video and audio data are recorded with time-divisional multiplexing in the MPEG data region.

3. Sector Construction

FIG. 5 shows the construction of a sector as a data unit in a track.

Figure 5A:
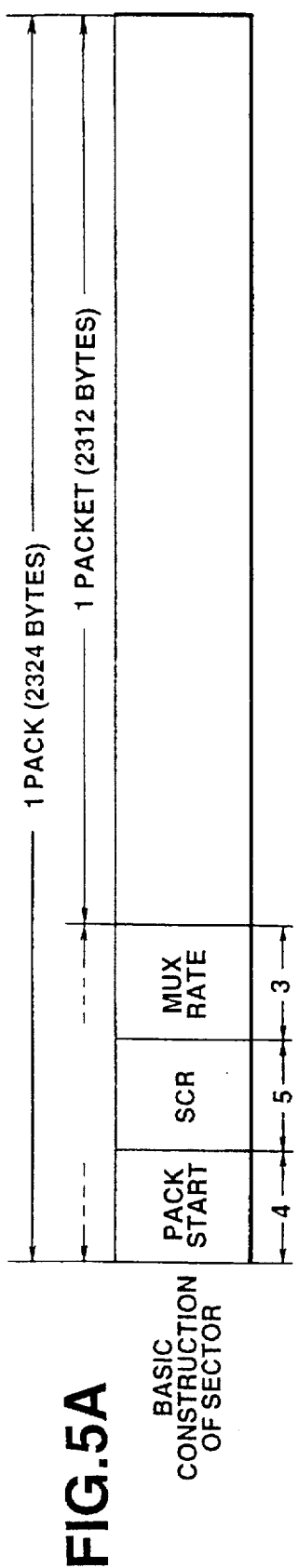
FIGS. 5A, 5B and 5C illustrate a sector construction of a video CD.
Figure 5B:
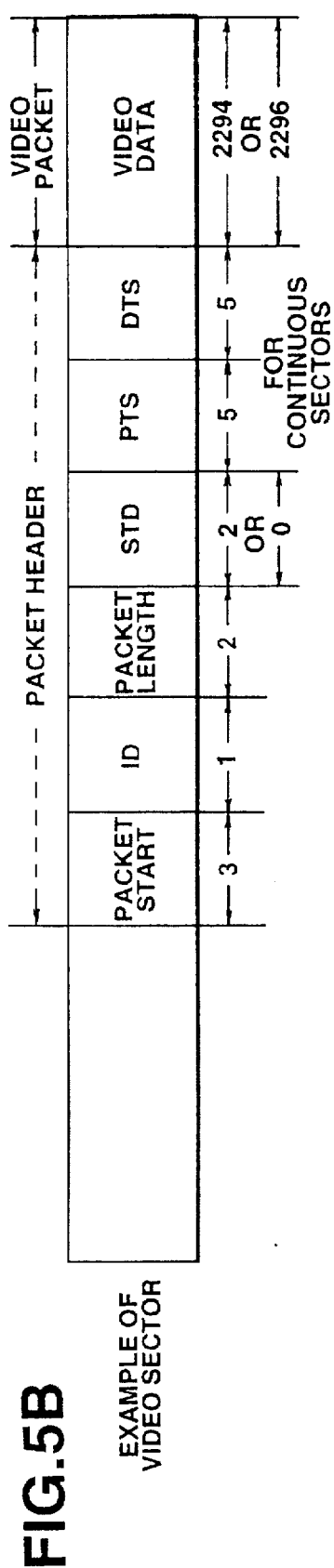

FIG. 5A shows the basic sector construction. Each sector is formed by a pack made up of a pack header and packet data.

Specifically, a 12-byte pack header is provided at the leading end of a sector, with the remaining 2312 bytes making up a packet.

In the pack header is arrayed a 4-byte pack start code, followed by a 5-byte system clock reference (SCR) and a 3-byte trailing end MUX rate in this order.

The system clock reference (SCR) is a code meaning a sort of the absolute time. Based on SCR as the reference, the picture output start time (presentation time stamp or PTS), as later explained, is set.

The SCR is represented by $SCR(i) = C + i*1200$, where i is an index number of a sector in a video data stream and is equal to 0 in the leading front margin portion, C is a constant always equal to 0 and 1200 is a value obtained on dividing a system clock of 90 kHz with 75 Hz (90000/75=1200).

The pack header is provided in each sector V of the video data.

Such pack header is provided in each sector constituted by the pack. In the case of the sector V in which the sector records video data, a 2312-byte packet following the pack header is configured as shown for example in FIG. 5B.

That is, the pack header is followed by a 18-byte packet header, the leading three bytes of which constitute a packet start code. The packet start code is followed by a 1-byte ID, a 2-byte packet length, a 2-byte system target decoder (STD), a 5-byte PTS and a 5-byte decoding time stamp (DTS). The picture output start time point (PTS) is set for synchronizing the video data with audio data. The decoding time stamp (DTS) specifies the decoding start time point. 2294 bytes following the packet header represent a video packet in which actual video data is recorded. That is, a video data stream constituted by the above-mentioned I-, P- and B-pictures is recorded in the video packet.

In a domain having the video sectors V arrayed on end, the video packet in the first video sector V is comprised of 2294 bytes, as explained previously. However, in the succeeding video sectors V, the STD in each packet header may be omitted, so that the video packet may be extended to 2296 bytes.

Figure 5C:
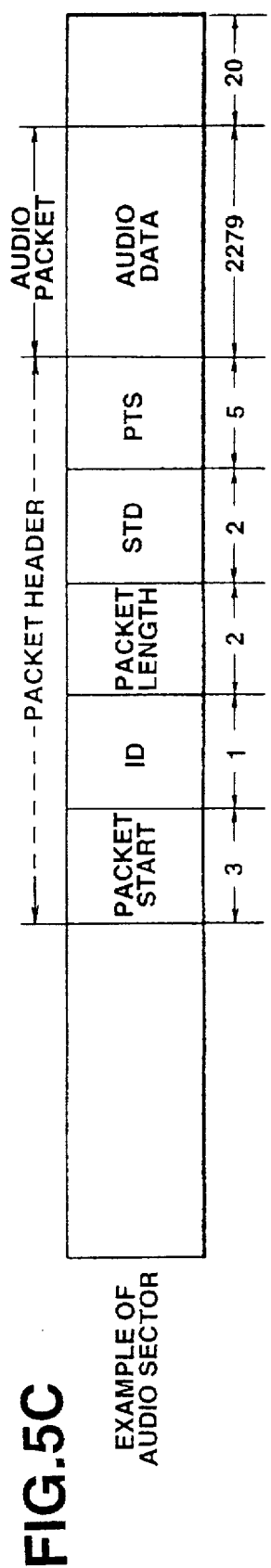

If the sector is the sector A for recording audio data, the 2312-byte packet following the pack header is configured as shown for example in FIG. 5C.

That is, the packet header is provided in continuation to the pack header, as in the case of the video sector V. The packet header is constituted by a 3-byte packet start code, a 1-byte ID, a 2-byte packet length, a 2-byte STD and a 5-byte PTS, totalling at 13 bytes.

2297 bytes are allocated to an audio packet in which audio data encoded for compression is recorded. At the trailing end of the audio packet is appended a 20-byte vacant area to constitute a 2324-byte pack or sector.

With the above construction of the sector, the time information items for synchronization are SCR, DTS and PTS. That is, the video sectors V and the audio sectors A are chronologically arrayed in a track, as shown in FIG. 4, so that the video data and the audio data need to be synchronized with each other. The SCR, DTS and the PTS are used for this synchronization.

That is, the decoding start time in the video packet or the audio packet is specified by the DTS in each sector, using the SCR as reference clocks. The outputting time (picture display or speech output) is specified by the PTS.

Thus the video data of the video sector V and the audio data of the audio sector A may be synchronized with each other by these time information items.

4. Arrangement on Disc

With the CD-Da, as shown for example in FIG. 6A, a lead-in area is provided on the inner most periphery of an optical disc for recording TOC data. The TOC data may be exemplified by the start positions of the tracks (programs), number of tracks, play time or the like.

The lead-in area is followed by tracks #1 to #n for recording audio data. On the outer most peripheral position is provided a lead-out area. In each track, audio data quantized with the sampling frequency of 44.1 kHz and 16 quantization bits are recorded along with the sub-code data.

In the video CD, similarly to the CD-DA, a lead-in area is provided on the inner most periphery of the optical disc for recording TOC data therein. The video data is recorded in the tracks #1 to #n next following the lead-in area. A lead-out area is provided on the outer most peripheral region.

However, with the video CD, the track #1 is used as a video CD data track, without being used for recording video or audio data. The actual video and audio data are recorded on the tracks #2 to #n. That is, the tracks #2 to #n are configured by the video sectors V and the audio sectors A as shown in FIG. 5.

In the case of the video CD, it is possible to provide tracks in which only audio data is recorded, in which case audio data quantized with the sampling frequency of 44.1 kHz and 16 quantization bits, as in the case of the CD-DA, is recorded.

In both the CD-DA and the video CD, the maximum number of tracks (programs) is 99, so that the maximum of 99 airs and a maximum of 98 sequences may be recorded in the case of the CD-DA and the video CD, respectively. The sequence means a partition comprised of a series of consecutive moving pictures. If pictures for karaoke are recorded, the sequence is an air (1 track), whereas, with a motion picture, the sequence is usually an optical disc.

In a video CD data track, employing the track #1, the primary volume descriptor (PVD), a karaoke basic information area, a video CD information area, a segment play item area and other file areas, such as CD-I application programs, are provided, as shown at a lower portion of FIG. 6B. These areas will be explained in detail subsequently.

5. TOC and Sub-code

The TOC and the sub-codes, recorded in the lead-in areas of the video CD and the CD-DA, will be explained subsequently.

The minimum data unit recorded on the video CD and the CD-DA is one frame. 98 frames make up one block.

Figure 7:
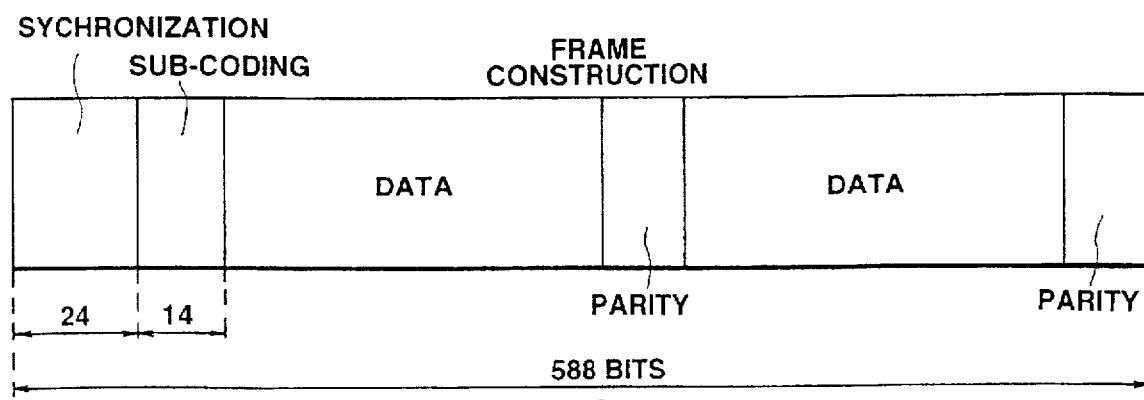
FIG. 7 illustrates a disc frame structure.

588 bits make up on frame, as shown in FIG. 7. The leading 24 bits make up synchronization data the next following 14 bits make up a sub-code data area. Data and parity are arrayed next to the sub-code area.

Figure 8A:
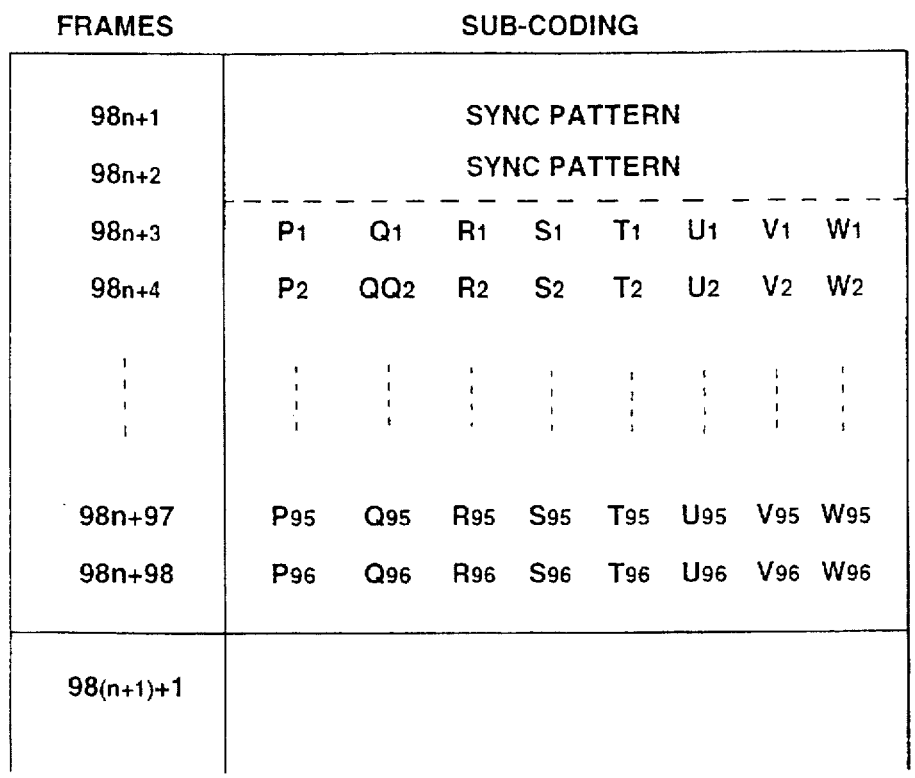
FIGS. 8A and 8B illustrate a sub-code data structure.

98 of the above frames make up one block. The sub-code data, taken out from these 98 frames, constitute one-block sub-code data, as shown for example in FIG. 8A.

The sub-code data of the first and second frames (frame 98+1 and frame 98+2) of the block constitute a synchronization pattern. The sub-code data of the third frame up to the 98th frame (frame 98n+3 to frame 98n+98) constitute data of a P-, Q-, R-, S-, T-, U-, V- and W-channels, each made up of 96 bits.

Of these channels data, the P-channel data and the Q-channel data are used for management for e.g., accessing. The P-channel data represent only the pause portion between tracks, with the Q-channel data taking charge of finer control.

Figure 8B:
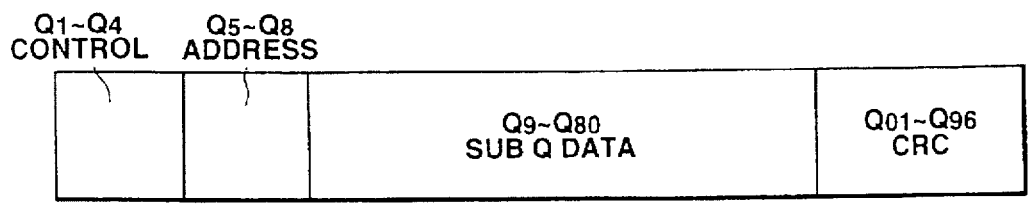

Specifically, 96-bit Q-channel data (bits Q1 to Q96) are configured as shown for example in FIG. 8B.

That is, the four bits of Q1 to Q4 are used as control data for identifying the number of audio channels, emphasis and identification of the CD-ROM.

For example, the 4-bit control data are defined as follows:

| | |
|---|---|
| "0***" | ... 2-channel audio |
| "1***" | ... 4-channel audio |
| "*0**" | ... CD-DA |
| "*1**" | ... CD-ROM |
| "**0*" | ... digital copying not permitted |
| "**1*" | ... digital copying permitted |
| "***0" | ... no pre-emphasis |
| "***1" | ... pre-emphasis |

It is noted that "****" denotes a binary number in which * may be any of 0 or 1.

The four bits of bits Q5 to Q8 represent addresses used as control bits for the sub-Q data.

The 4bit address 4 of the bits being "0001" or "0100" means that the sub-Q data of the next following bits Q9 to Q80 is the audio Q-data or the video Q-data, respectively.

72 bits of bits Q9 to Q80 represent sub-Q data, with the remaining bits Q81 to Q96 being the cyclic redundancy code (CRC).

Figure 9A:
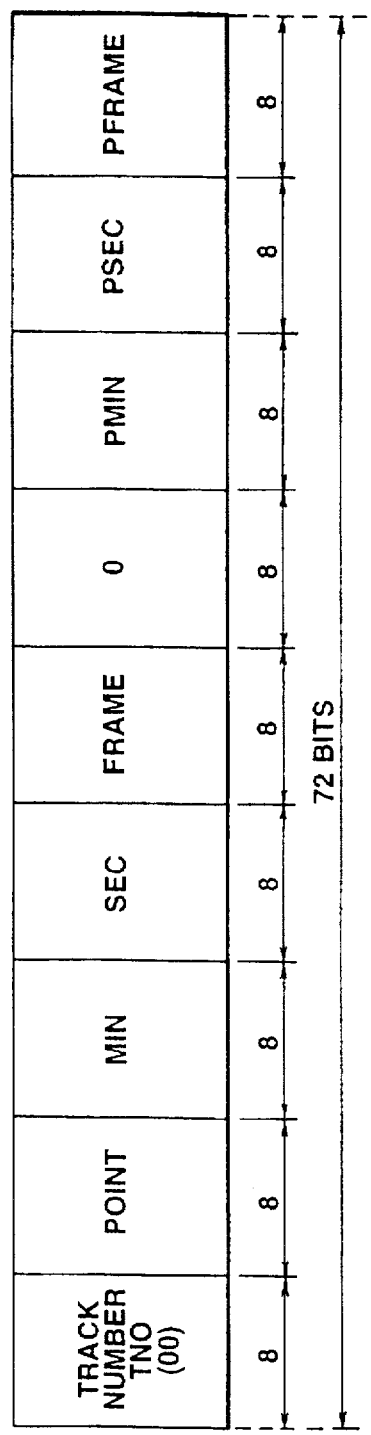
FIGS. 9A and 9B illustrate sub-Q data.

In the lead-in are, the sub-Q data recorded therein represents the TOC information. That is, the 72-bit sub-Q data, made up of bits Q9 to Q80 in the Q-channel data recorded in the lead-in area represents the information such as the track number, as shown for example in FIG. 9A. The sub-Q data is made up each of 8 bits.

That is, the track number is recorded first in the lead-in area. In the lead-in area, the track number is fixed at "00" "**" means the binary coded decimal number).

Next to the track number, there is recorded the point (POINT), followed by minutes (MIN), seconds (SEC) and the frame number (FRAME) specifying the elapsed tome in the track.

Then, PMIN, PSEC and PFRAME are recorded. The meaning of the PMIN, PSEC and PFRAME is determined by the POINT value.

Specifically, if the POINT value is '01' to '99', such value specifies the track number, and PMIN, PSEC and PFRAME are the minutes, seconds and frame numbers specifying the absolute time address of the start point of the track having such track number.

If the POINT value is 'A0', PMIN means the track number of the first track. Distinction between CD-DA, CD-I and CD-ROM (XA design specification) is made depending upon the PSEC value.

If the POINT value is 'A1', PMIN denotes the track number of the last track.

If the POINT value is 'A2', PMIN, PSEC and PFRAME denote the starting point of the lead-out area in terms of the absolute time address.

In the case of an optical disc having e.g., six tracks (programs) recorded thereon, data recorded as shown for example in FIG. 10 are recorded in the TOC made up of the sub-Q data.

Specifically, the track number TNO is all '00'.

The block NO represents the number of the one-unit sub-Q data read as 98-frame block data, as explained previously.

The TOC data of the same contents are recorded over three blocks of the TOC data. If the POINT value is '01' to '06', PMIN, PSEC and PFRAME denote the start point of each of the tracks #1 to #6.

If the POINT value is 'A0', PMIN denotes '01' as the first track number. PSEC is a value used for identifying the optical disc type, as explained previously. If the optical disc is the CD-ROM (XA design specifications), PEC='20' as shown. If the optical disc is the CD-DA or CD-I, PEC='20' or '10', as shown, respectively.

It is noted that PIN for the POINT value 'A1' is the track number of the last track, while PMIN, PSEC and PFRAME for the POINT value 'A2' denote a start point of the lead-out area.

For the blocks n+27 ff., the contents of the blocks n to n+26 are iteratively recorded.

Figure 9B:
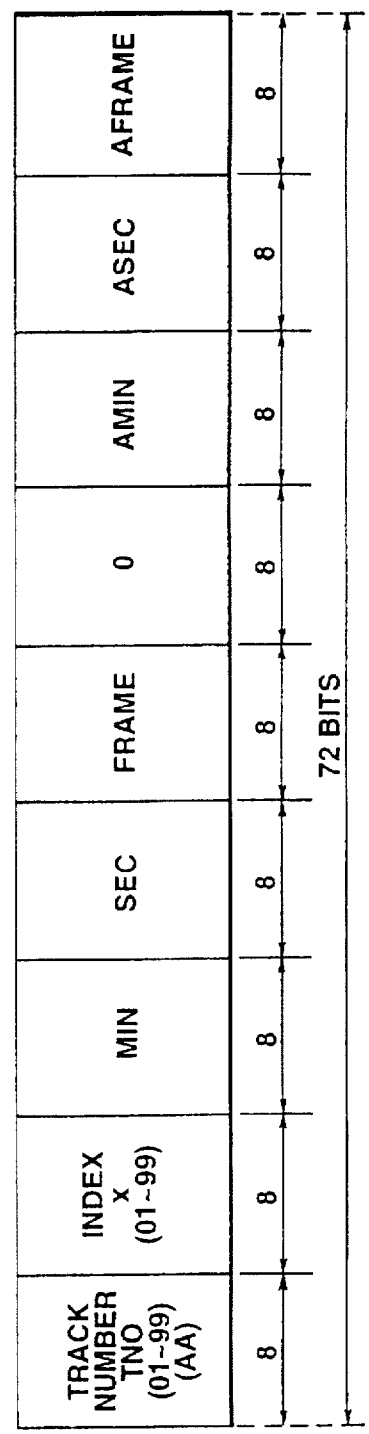

In the tracks #1 to #n and in the lead-out area, the sub-Q data recorded therein are configured as shown for example in FIG. 9B.

First, the track number is recorded. That is, for the tracks #1 to #n, the track numbers assume any of the values of '01' to '99'. In the lead-out area, the track number is 'AA'.

Next to the track number, the information capable of further dividing each track is recorded as the index.

As the elapsed time in the track, minutes (MIN), seconds (SEC) and the frame numbers (FRAME) are recorded. Further, as AMIN, ASEC and AFRAME, the absolute time address is recorded as the minute (AMIN), second (ASEC) and he frame number (AFRAME), respectively.

6. Directory Construction

Figure 11:
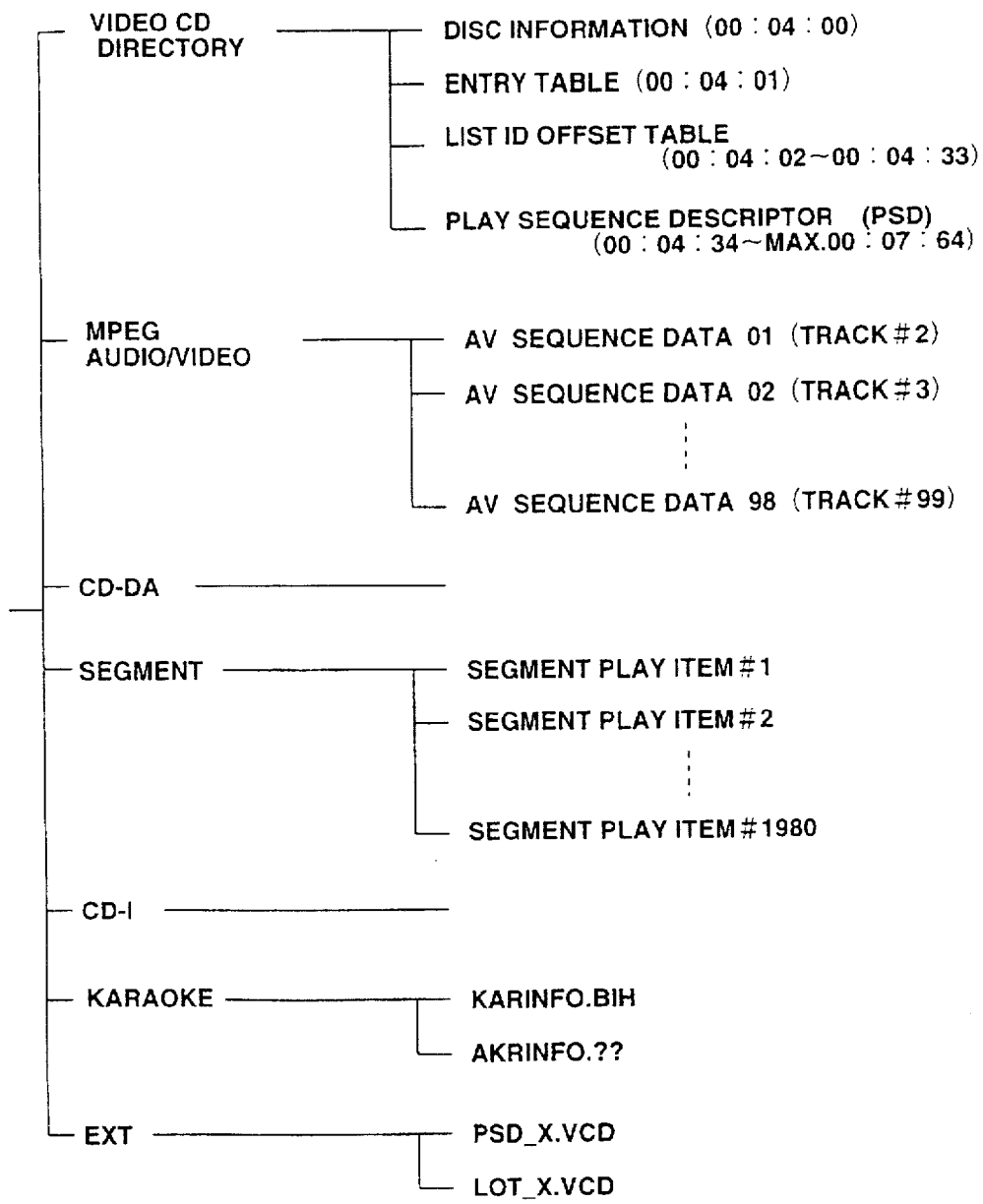
FIG. 11 illustrates a directory structure of a video CD.

FIG. 11 shows the directory structure of the video CD.

The video CD directory, shown in FIG. 6B, is comprised of the video CD directory, MPEG audio/video, CD-DA, segment, CD-I, karaoke and EXT, as shown in FIG. 11.

The video CD directory is recorded in the video CD information area in the track #1 shown in FIG. 6B, and is comprised of a disc information entry table, a list ID offset table and a play sequence descriptor, each of which will be explained subsequently.

The MPEG audio/video represents the audio/video sequence data. With the video CD capable of recording up to 99 tracks at the maximum, the sequence data is comprised of up to 98 tracks #2 to #99 at the maximum.

The segment is comprised of up to 1980 segment play items #1 to #1980, these being recorded in a segment play item area in the track #1.

Further, the CD-I application program in the track #1 has its directory file built as the CD-I into the directory structure. On the other hand, if the karaoke basic information area is to be in use, its directory file is built as the karaoke into the directory structure.

If a track having only audio data recorded therein is provided, its directory file is built as the CD-DA in a directory structure, whereas, if $PSD_{13}X.VCD$ and $LOT_{13}X.VCD$ are used, the directory files thereof are built as EXT in the directory structure.

7. Video CD Data Track

In the video CD, the track #1 is used as the video CD data track, as mentioned previously.

In the track #1 region, there are recorded the primary volume descriptor (PVD), a karaoke basic information area, a video CD information area, a segment play item area and the like files, such as CD-I application programs, as explained by referring to FIG. 6.

The PVD is arrayed beginning from the position of the absolute time address 00:02:16 (minute: second: frame number) on the disc, as shown in FIG. 6B.

On the other hand, the karaoke basic information area is arrayed beginning at the position of the absolute time address 00: 03: 00.

The video CD information area is arrayed beginning at the position of the absolute time address 00: 04: 00.

The segment play item area and the CD-I application program are arrayed beginning from the position represented within the video CD information area and from the position represented within the CD-I application program, respectively.

a. Primary Volume Descriptor (PVD)

FIG. 12 shows the structure of the primary volume descriptor (PVD) arrayed beginning from the position of the absolute time address 00: 02: 16.

First, as the volume structure standard ID, the CD001h data, where h stands for the hexadecimal number, is recorded. The system identifier, volume identifier, number of album volumes and the album set sequence numbers are then recorded. Each album is made up of a single optical disc or plural optical discs. The number of album volumes represents the number of optical discs in one such album. The album set sequence number represents the album disc number.

Next to the album set sequence number, a logical block size, path table, pass table address and the route directory record are recorded.

As the album identifier, the disc tile, publisher and the name of the author are recorded.

Then, as he application identifier, the application name of the CD-I is recorded.

Next to the application identifier, the copyright file number, summary file number, table-of-contents file number, date of preparation, date of correction, due date, effective date, file structure version number and the XA label code are recorded.

b. Video CD Information

The video CD information is recorded beginning from the position of the absolute time address 00: 04: 00 on the disc, as mentioned previously.

Figure 13:
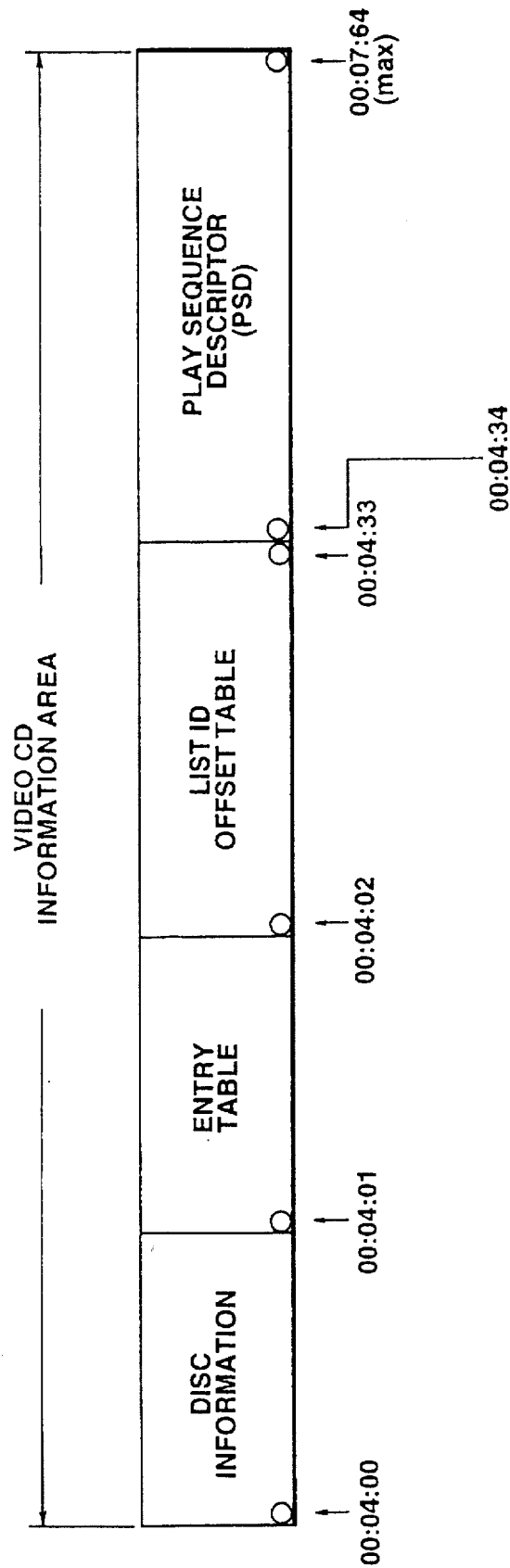
FIG. 13 illustrates a video CD information area of a video CD.

The video CD information is comprised of a disc information entry table, a list ID offset table and a play sequence descriptor (PSD), as shown for example in FIG. 13. These are of the file structure in the video CD directory, as shown and explained in connection with FIG. 11.

The disc information is arrayed beginning from the absolute time address 00: 04: 00 representing the leading position of the video CD information. The entry table is arrayed beginning from the absolute time address 00: 04: 01. The list ID offset table is arrayed beginning from the absolute time address 00: 04: 02 and terminating at the absolute time address 00: 04: 33. The play sequence descriptor (PSD) is arrayed beginning from the absolute time address 00: 04: 34 and is present up to the absolute time address 00: 07: 64 at the maximum.

b1. Disc Information

The disc information arrayed beginning at the absolute time address 00: 04: 00 is explained. FIG. 14 shows the structure of the disc information.

The system identifier of the video CD is recorded at the first to eighth bytes.

The version number is recorded at two bits, i.e., the ninth and tenth bytes. This version number is 0200h for the version 2.0.

The album descriptor proper to each optical disc is recorded at the 16 bytes of from 1st to 26th bytes.

The number of volumes in the album is recorded at two bytes, that is at the 27th and 28th bytes. The album set sequence number is recorded in the next following two bytes. The number of volumes in the album is the number of the optical discs used for recording the sole album, as explained previously. The album sequence number identifies the optical(disc number.

The size map of the moving picture track is recorded at 13 bytes of the 31st to 43rd bytes. The size map is the data used for judging whether data recorded in the tracks #2 to #99 is the signal of the NTSC system or that of the PAL system. Specifically, the LSB of the first one of 13 bytes specifies the track #2. The bits from this LSB up to the bit b1 of the last byte each record data up to the track #99. The bits 0 and 1 corresponding to the tracks denote the NTSC system and the PAL system, respectively.

A status flag is recorded at the 44th byte. Among bits $b_0$ (LSB) up to $b_7$ (MSB) of this one byte, the bit $b_0$ is a flag of the karaoke basic information flag. Specifically, the bit $b_0$ equal to 0 indicates the absence of the karaoke basic information. On the other hand, the bit $b_0$ equal to 1 indicates the presence of the recorded karaoke basic information. At the four bytes of the 45th to 48th bytes, the byte size of the play sequence descriptor (PSD) is recorded. The PSD is recorded beginning from the absolute time address 00: 04: 34 and terminating at the absolute time address 00: 07: 64 at the maximum, with the byte size being variable, as shown in FIG. 13. Thus the PSD byte size is recorded here. The PSD is made up of plural lists, that is a selection list, a play list and an end list, used for playback control, each list being recorded as the PSD, as will be explained subsequently. If there is no PSD, that is in case of an optical disc not having the playback control function, these four bytes are all set to 00h.

The first segment address is recorded in three bytes of the 49th to 51st bytes. It has been stated in connection with FIG. 6B that the start point of the segment play item area is recorded in the video CD information area. This area corresponds to these three bytes. Although the segment play items are not described in detail, up to the maximum of 1980 segment play items can be recorded in the segment play item area shown in FIG. 6B. The respective segment play items are comprised of video data or audio data employed for playback control or the like.

An offset multiplier is recorded at the 52nd byte. The multiplier is used for calculating the address of each list in the PSD and is set to e.g., 8.

The number of the list IDs is recorded at two bytes, that is at the 53rd and 54th bytes. The number of the list IDs specifies the number of effective lost IDs recorded in the ID offset table which will be explained subsequently.

The number of segment play items recorded in the segment play item area is recorded at two bytes, that is at the 55th and 56th bytes.

The segment play item contents table is recorded at 1980 bytes of the 57th to 2036th bytes. The segment play item contents table specifies the attributes of the segment play items recorded in the segment play item area. That is, up to the maximum number of 1980 segment play items are recorded as the segment play items #1 to #1980. The segment play item contents table is comprised of 1-byte attribute data associated with the segment play items #1 to #1980, as shown for example in FIG. 15.

Specifically, the attribute data is defined for each of bits $b_0$ to $bit_7$ of one byte, as shown below. The bits $b_6$ and bit $b_7$ are not defined.

bits $b_1$ and $b_0$

| "00" | ... there is no MPGb audio data |
| "01" | ... monaural audio data |
| "10" | ... stereo audio data |
| "11" | ... dual channel audio data bits $b_4$ to $b_2$ | bits $b_4$ to $b_2$

| "000" | ... there is no MPEG video data |
| "001" | ... still picture data of the standard level of the NTSC size |
| "010" | ... still picture data of the picture data of the high definition level |
| "011" | ... moving picture data of the NTSc size |
| "100" | ... not in use |
| "101" | ... still picture data of the standard level of the PAL size |
| "110" | ... still picture data of the standard level and high definition level of the of the PAL size |
| "111" | ... moving picture data of the PAL size | bit $b_5$

| "0" | ... sole item or leading one of continuous items |
| "1" | ... second and following items of continuous items |

The bytes beginning from the segment play item contents table and terminating up to the 2037th to 2048th bytes of the disc information are not defined.

b2. Entry Table

In the video CD information area, the entry table is arranged so as to begin at the absolute time address 00: 04: 01, as shown in FIG. 13.

In the entry table, a pre-set point within the audio/video sequence may be entered as a starting point.

Thus, in the present entry table, the ID identifying an entry file, version number or the number of entries are recorded and up to a maximum of 500 entries are recorded as the actual entry points. That is, the entries #0 to #499 may be set.

Each entry is made up of 4 bytes, of which one byte specifies the track number and the remaining three bytes specify the sector address, that is ASEC, AMIN and AFRAME.

b3. List ID Offset Table

In the sectors of the video CD information area beginning from the absolute time address 00: 04: 02 and ending at 00: 04: 33, a list ID offset table is arranged.

The play list or the selection list, recorded in the PSD as later described, is provided with the intrinsic list ID. In the list ID offset table are shown offset quantities specifying the positions of the respective lists. If the user designates the list desired to be reproduced, the reproducing device reproducing the video CD refers to the list ID offset table for grasping the position of the designated list in the PSD for allowing the contents of the list to be executed.

The list ID offset table is made up of 32 sectors at the maximum, as shown for example in FIG. 16. Each offset quantity is specified by 2 bytes, so that a 24k-number of offsets may be represented.

The PSD area, later described, has the absolute time address of from 00: 04: 34 up to the maximum of 00: 07: 64, so tat it represents an area of 3 seconds 31 frames at the maximum. This is equivalent to 256 sectors or 512 kbytes.

The 64k-number of the offsets, represented by the list ID offset table, is multiplied with 8 to give 512 kbytes. This multiplier value of 8 is the offset multiplier of the 52nd byte of the disc information shown in FIG. 14.

That is, one offset is equivalent to 8 bytes, so that, by multiplying the offset value with the offset multiplier 8, the pre-set position in the PSD area may be represented as the byte position from the leading position of the PSD (offset 0000h position).

In the list ID offset table, the start-up offset is first recorded, as shown in FIG. 16. This start-up offset is fixed at a value of 0000h.

FIG. 16, showing the case with the number of ID of n, gives offset values for the list ID1 to list IDn.

Meanwhile, the offset value of the 1st ID1, which is necessarily arrayed at the leading end of the PSD, is fixed at a value of 0000h.

The list ID, which is not in use, is fixed at a value of FFFFh.

b4. Play Sequence Descriptor (PSD)

The PSD is provided beginning from the absolute time address 00: 04: 34.

In this PSD are recorded the play list, selection list and the end list. In these lists, used for playback control as later explained, there are recorded the playback contents and data specifying the layer branching points.

The play list is such a list not containing data for branching to a lower layer, referred to hereinafter as the selection menu, and is employed for designating a series of contents to be reproduced.

On the other hand, the selection list is such a list containing a selection menu for branching to a lower layer.

Meanwhile, the list (play list or selection list) to be reproduced first is the list ID1 and is recorded at the leading position of the PSD (offset 0000h position).

Play List

The play list designating a series of contents to be reproduced is configured as shown for example in FIG. 17.

That is, a 1-byte play list header is provided for specifying that the list is the play list.

Next to the play list header, there is recorded, as the number of items, the number of play items recorded in the play list. The play item is the data specifying the contents to be reproduced. That is, data specifying the play items are recorded in the play list as being the play item #1 number to play item #1 number.

Next to the number of item data, a 2-byte list ID, proper to each list, is recorded.

Next to the list ID, the previous list offset, next list offset and the return list offset, each comprised of 2 bytes, are recorded.

The previous list offset specifies the position (offset) of the list to which the operation transfers after the previous operation has been performed. If the list is to be layered, and the position of a list of the next upper order is specified by the previous list offset, the user may perform the previous operation for restoring the operating state which is based upon the previous list.

If the previous list offset is FFFFh, the previous operation is inhibited.

The next list offset specifies the position of the list to which the operation is to transfer in continuation after the reproducing operation designated by the play list comes to a close or when the next operation has been performed. If the next list offset is FFFFh, the next operation is inhibited.

The return list offset specifies the position of the list to which the operation is to transfer when the return operation has been performed. For example, if the list is to be layered, and the upper most order list position is specified by the return list offset, the user may perform the return operation for restoring the operating state at a time to an operating state which is based upon the list of the upper most order.

Next to the return list offset, the 2-byte playing time, a 1-byte play item weight time, and a 1-byte auto-pause weight time are recorded.

The playing time specifies the number of sectors of the reproducing operations which is based upon this play list.

The play item weight time specifies the stand-by time until end of reproduction of respective play items. Specifically, the stand-by time of 0 to 2000 seconds is represented by 00h to FEh. The number FFh specifies waiting for the user's operation.

The auto-pause weight time denotes the standby time in the course of the auto-pause operation.

Finally, the numbers of the items #1 to #N to be reproduced are recorded by respective two bytes.

This play item number (PIN) is defined as shown for example in FIG. 18.

If PIN=0 or 1, such play item number specifies that nothing is reproduced.

If PIN=2 to 99, such play item number specifies the track number. If PIN=5, for example, the play item is that reproducing the track #5.

If PIN=100 to 599, subtraction of 100 from the PIN (PIN−100) gives the entry in the entry table. The entry table ia able to specify up to the maximum number of 500 of the entry points, by setting the entries #0 to #499, such that the value of (PIN−100) specifies one of the entry numbers of from #1 to #500.

If PIN=1000 to 2979, subtraction of 999 from the PIN gives the number of the segment play item. In the segment play item area, up to a maximum number of 1980 of segment play items may be recorded, by setting the segment play items #1 to #1980, such that subtraction of 999 from the PIN (PIN−999) gives one of the segment play items of from #1 to #1980.

PIN=600 to 999 and PIN=2980 to 65535 remain undefined.

If three play items are recorded in the play list, and the play item #1 number, play item #2 number and the play item #3 number are 4, 1001 and 102, respectively, the reproducing operation performed by the play list is such a reproducing operation in which the track #4 is reproduced first, the segment play item #2 is then reproduced and finally the reproduction from the entry point which is based upon the entry #3 is carried out.

Selection List

The selection list is such a list for displaying a selection menu on a display screen for allowing the user to select the operation to which the operation is to transfer. The selection list is configured as shown for example in FIG. 19.

That is, a 1-byte selection list header is provided thus indicating that the list is the selection list.

Next to the selection list header, a 1-byte number of alternatives in the selection list is recorded with the interposition of a 1 byte which is not in use. The number of alternatives is 99 at the maximum.

The first number of the alternative is then recorded. The first number of the alternative is usually 1. However, if there are a large number of alternatives to be selected, and hence plural selection lists are used, such number in each of the second and the following selection lists is the first number of the alternative in such list.

Next to the list ID, a previous list offset, a next list offset, and a return list offset, each consisting of two bytes, are recorded, as in the case of the play list.

The previous list offset specifies the position of the list (offset) to which the operation is to transfer in case the previous operation has been performed. If the previous list offset is FFFFh, the previous operation is inhibited.

The next list offset indicates the position of the selection list to which the operation is transfer in continuation when the next operation has been performed. If there is no list to which the operation is to transfer in continuation, the offset is set to FFFFh.

The return list offset denotes the position of the list to which the operation is to transfer in case the return operation has been performed.

If setting is made so that one selection is done in plural selection lists, these may be exploited effectively. For example, if 12 alternatives are set, and four alternative are set in each of the three selection lists, the respective selection lists are interconnected in the forward and backward directions by the previous list offset and the next list offset in order to permit the user to search the desired alternative by the previous or next operation.

Next to the return list offset, a two-byte default list offset is recorded. This indicates the position of the list to which the operation is to transfer when the user performs an actual operation without making selections.

On the other hand, a two-byte timeout list offset is recorded. This indicates the position of the list to which the operation is to transfer when a pre-set time has elapsed without the user performing any inputting operation on the reproduced and displayed selection menu. If the timeout list offset is FFFFh, a particular alternative is selected at random from among the alternatives shown in the selection menu at a time point when a pre-set time has elapsed without input. The operation transfers to this selected alternative.

Next to the timeout list offset is recorded a 1-byte wait time until timeout. If the recorded wait time has elapsed without any input by the user, the operation is to transfer to the above-mentioned timeout list offset.

The value recorded in the wait time until timeout is defined as shown for example in FIG. 20.

If the recorded timeout value is 00h(0), the standby time is set to be zero.

If the recorded wait time value is any one of 01h(1) to 3Ch(60), the value directly denotes seconds. For example, if the wait time value is 30, the standby time is 30 seconds.

If the recorded wait time value is 3Dh(61) or 3Eh(62), the standby time is 70 seconds and 80 seconds, respectively. That is, for the wait time value of 61 or larger, the standby time is defined by (n−60)×10+60 seconds. If the wait time value is FEh, the standby time is the maximum standby time. That is, since FEh is 254, the standby time is 2000 (=(254−60)×10+60) seconds.

If the wait time value is FFh, the operating state based upon the selection list is to keep waiting until the next input.

Next to the wait time until timeout, a loop count and the jump timing, each being 1 byte, are recorded. The loop count and the jump timing indicate the number of times of repetition of the play item in the list and the timing to transfer to the next 1st after the selecting operation has been performed.

Next to the loop count and the jump count, a 2-byte play item number (PIN) is recorded. The PIN denotes, by the definition shown in FIG. 18, the play item to be reproduced in the state of execution of the selection list. It is usually the still picture data for displaying the menu on the picture that is reproduced in the selection list. Thus the video data for menu is recorded as the segment play item. In many cases, a specified segment play item is designated in each selection list.

If, for example, the data for the menu screen associated with the selection list is recorded as the segment play item #4, the PIN is 1003.

This, one PIN is provided in the selection list.

Finally, for specifying the operation to be executed by selection within the alternatives, there are recorded selection #BSN offset to selection #(BSN+NOS−1) offset, each comprised of two bytes. BSN and NOS denote the first number of an alternative recorded in the fourth byte of the selection list and the number of alternatives recorded in the third byte of the selection list. Thus, in the selection list having alternatives 1 to 4, the selection #1 offset to selection #4 offset are recorded.

These selection offsets indicate the position of the list (selection list or the play list) to which the operation is to transfer when the alternative is selected.

If, for example, the user selects the alternative 2 on the menu display, the operation is designated to transfer to the list indicated by the selection #2 offset.

End List

The end list specifies the terminal end of the application. The end list has eight bytes, of which one is an end list header and the remaining seven bytes are all set to 00h.

c. Segment Play Item

In the video CD data track, there is provided a segment play item area, as shown in FIG. 6. The start point of the segment play item is indicated by three bytes, that is the 49th to 51st bytes, of the disc information, as indicated in FIG. 14.

Up to a maximum number of 1980 of the segment play items can be recorded in the segment play item area.

The respective segment play items can be freely generated by still picture data, moving picture data, audio data or the like.

Each segment is made up of 150 sectors. Each segment play item may be data reproduced as sole items or plural continuously reproduced items.

Figure 15:
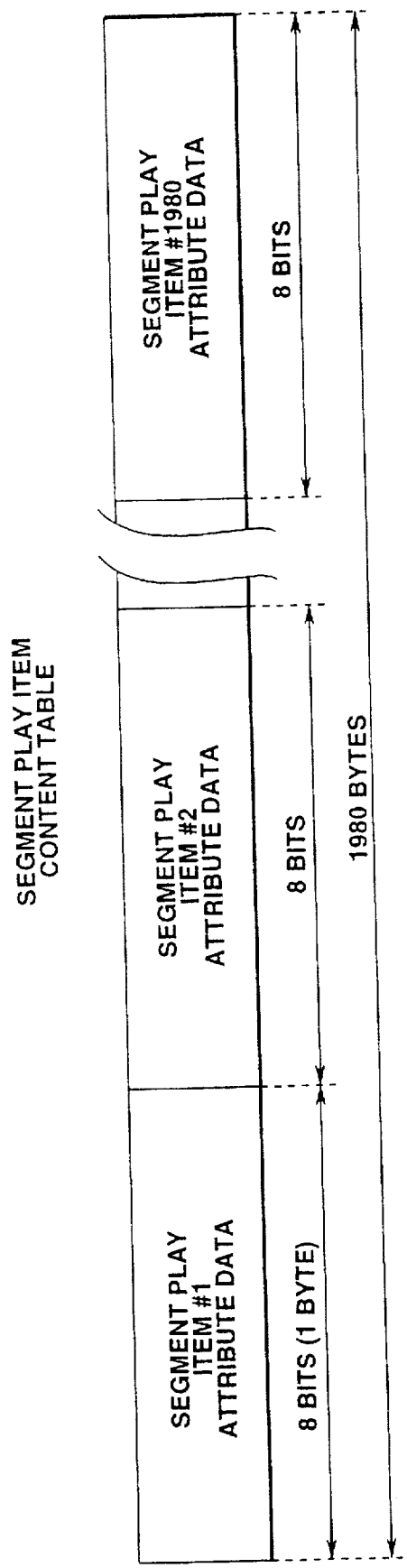
FIG. 15 illustrates a segment play item contents table in the disc information in the video CD.

Each segment play item has its data attributes represented by segment play item contents table of the 57th to 2036th bytes in the disc information table, as explained in connection with FIG. 15.

Using the segment play item, menu screens for the selection list may be provided, as explained previously.

II. Playback Control (PBC)

1. List Structure

By pre-recording the play list and the selection list on the video CD as explained previously, it becomes possible with a video CD reproducing device to implement playback control. That is, the video D functions as a simple interactive software which represents the combination of the moving pictures, still pictures and the speech.

Specifically, it is possible with the video CD to record several still picture data of a menu screen in the segment play item area as segment play items and to enable several branching reproduction and to reproduce the play items selected by branching in accordance with the play list. In other words, it is possible with the video CD to form a description file layered by the selection list and the play list and to transfer to a lower order layer responsive to user selection in order to carry out the desired reproducing operation.

As the basic list structure, the selection list is arrayed at an upper most order position and several play lists are provided as alternatives of the selection list. For example, specified play lists are designated as the selection #1 offset to selection #3 offset for the selection list. The reproducing device displays the menu on the screen based upon the selection list in order to permit the user to select the menu.

If, for example, the user selects the selection #3, the reproducing device transfers to the play list specified by the selection #3 offset, and reproduces data specified as the play item #1 number to play item #N number of the play list. For example, if the track #5 is designated as a play item #1 number in the play list to which the operation has transferred, the reproducing device executes reproduction of the track number #5.

2. Illustrative Example

Figure 21:
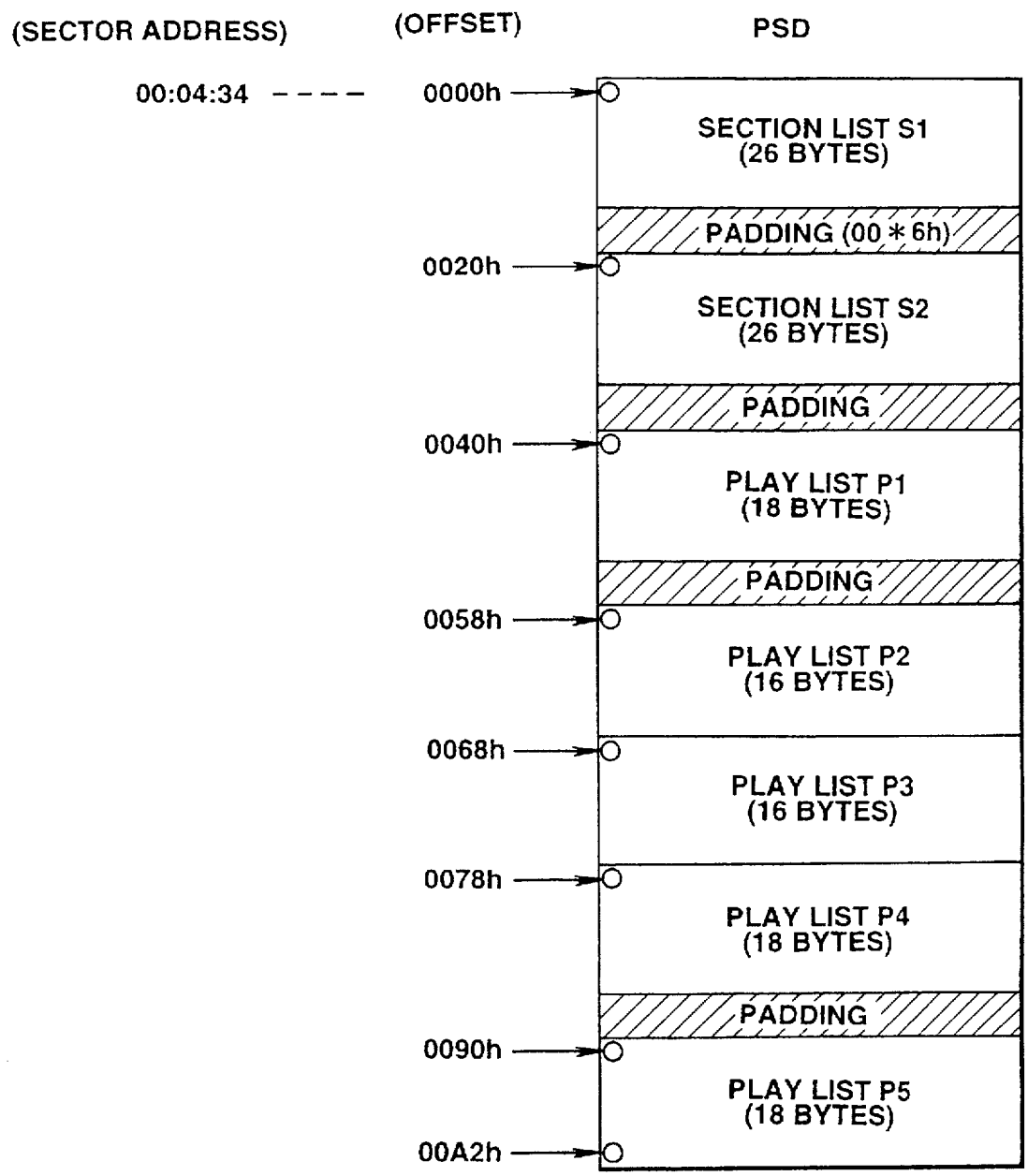
FIG. 21 illustrates a list structure of the video CD.
Figure 22:
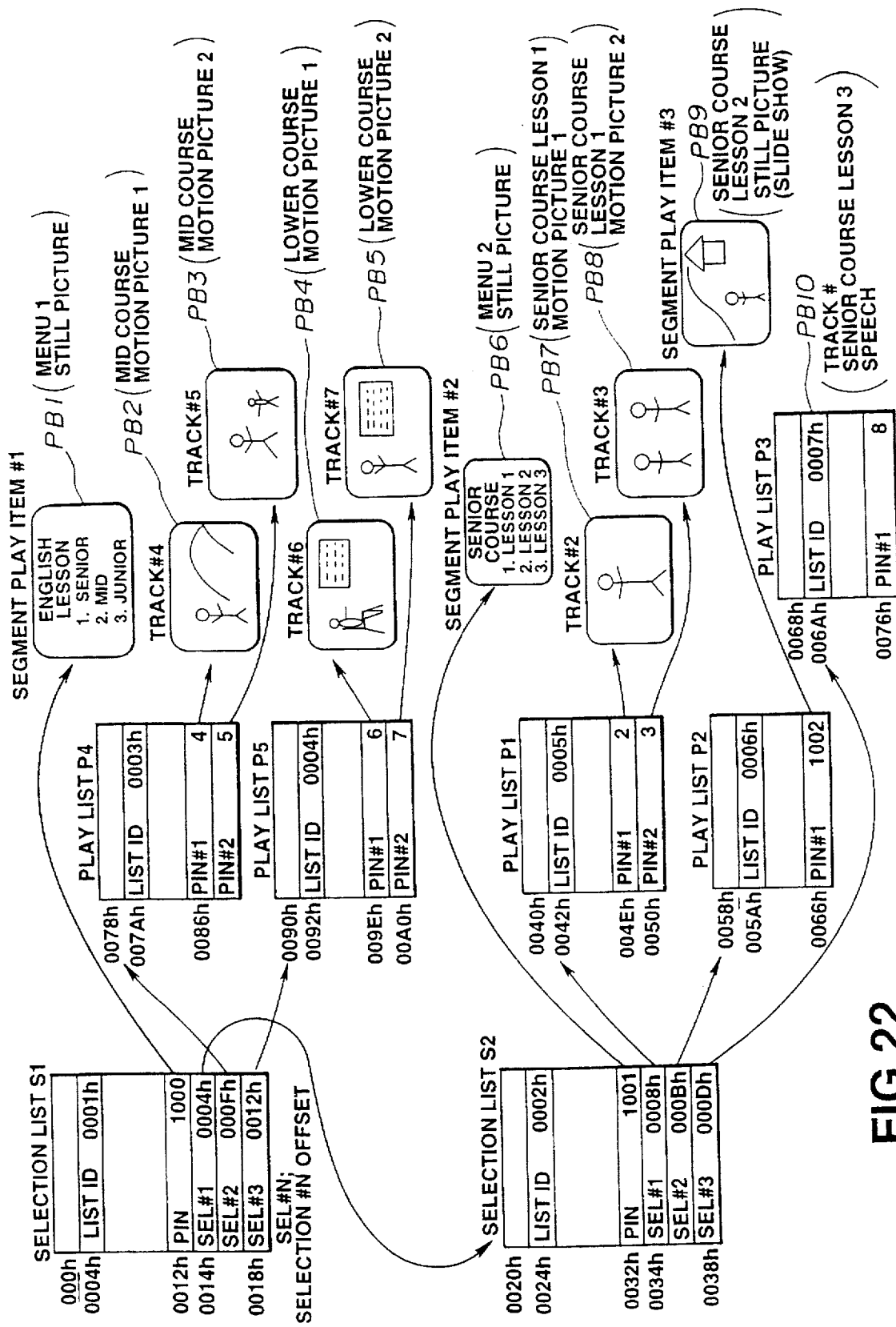
FIG. 22 illustrates the playback control operation in the list structure of the video CD.

An illustrative example of the playback control operation by the reproducing device is explained by referring to FIGS. 21 and 22. In the present illustrative example, a video CD is a software of a lesson in English conversation.

It is assumed that the selection list and the play list are recorded as the play sequence descriptor (PSD) from the position of the absolute time address in the video CD information area, as shown for example in FIG. 21. That is, selection list Si and S2 and the play lists P1 to P5 are recorded.

For each list, a list ID is appended, as shown in FIG. 22. That is, as the list ID, 0001h, 0002h, 0005h, 0006h, 0007h, 0003h and 0004h are recorded for the selection list S1, selection list S2, play list P1, play list P2, play list P3, play list P4 and play list P5, respectively.

The reproducing device entering the playback control operation reproduces and executes the selection list S1 whose list ID is 0001h.

Specifically,the reproducing device reproduces play item numbers (PIN) recorded in the selection list S1 based upon the selection list S1. In the PIN is recorded a value 1000. This value 1000 is a value indicating the segment play item #1, as indicated in FIG. 18. The reproducing device reproduces the segment play item #1 recorded in the segment play item area.

In the segment play item #1 is recorded still picture data for representing the menu picture PB1 for selecting the course of the English lesson, as shown in FIG. 22. The reproducing device displays the menu picture PB1.

In the selection list S1 are recorded the selection #1 offset to the selection #3 offset associated with the three alternatives. The reproducing device displays a menu comprised of three alternatives based upon the segment play item #1. Meanwhile, Sel#N in the drawings denotes the selection #N offset.

The user enters a desired alternative number for the menu picture PB1. If, for example, the user inputs the alternative number 1, the reproducing device reproduces the list indicated in the selection #1 offset. The selection #1 offset is 0004h. The reproducing device multiplies the value with the multiplier 8 to give a value 0020h which is an offset representing the position of the selection list in the PSD in terms of the number of bytes (offset bytes).

In the PIN in the selection list S2, a value 1001 is shown. This PIN denotes the segment play item #2. Thus the reproducing device reproduces the segment play item #2.

In the segment play item #2 is recorded still picture data for displaying the menu picture PB6 for selecting lesson courses 1 to 3 in the senior course of the lessons in English. The reproducing device displays the menu picture PB6.

If the user inputs the alternative number 1 for selecting the lesson 1 of the senior course, the reproducing device reproduces the list indicated in the selection #1 offset in the selection list S2. The selection #1 offset value is 0008h. The reproducing device multiplies the value with the offset multiplier 8 to give 0040h. The reproducing device then reproduces 0040h, that is the play list P1.

In the play list P1, "2" is recorded as PIN #1. That is, the track #2 is designated. On the other hand, "3" is recorded as the PIN #2, so that the track #3 is designated. Thus, in executing the play list P1, the reproducing device reproduces the track #2 for displaying the moving picture PB7 while outputting the speech associated with the moving picture PB7. The moving picture PB7 and the speech, reproduced from the track #2, are the moving picture and speech for the senior course lesson 1.

When the reproduction of the track #2 comes to a close, the reproducing device reproduces the track #3 for displaying the moving picture PB8 and outputting the speech.

If, as the menu picture PB6 is being displayed based upon the selection list S2, the user enters the alternative number 2, the reproducing device reproduces the list specified by the selection #2 offset in the selection list S2, that is the play list P2.

In the play list P2 is recorded "1002" as PIN#1. That is, the segment play item #3 is designated. Thus the reproducing device reproduces the segment play item #3, in executing the play list P2, and displays e.g. the still picture PB9, while outputting the speech associated with the still picture PB9. The still picture PB9 and the speech are the still picture and the speech in the slide show in e.g., the senior course lesson 2.

If, when the menu picture PB6 is displayed, based upon the selection list S2, the user inputs the alternative number 3, the reproducing device reproduces the list indicated on the selection #3 offset in the selection list S2, that is the play list P3.

In the play list P3, there is recorded "8" as PIN#1, that is, the track #8 is designated. If this track #8 is a track only of e.g., digital audio data, the reproducing device reproduces the track #8 for the senior course lesson 3 and outputs only the speech (PB10).

If, when the menu picture PB1 based upon the first selection list S1 is displayed, the user inputs the alternative number 2 for the senior course, the reproducing device reproduces the list indicated on the selection #2 offset in the selection list S2, that is the play list P4.

In the play list P4, there is recorded "4" as PIN#1, that is the track #4 is designated, while there is recorded "5" as PIN#2, that is the track #3 is designated. Thus the reproducing device first reproduces the track #4, in executing the play list P4, for displaying the moving picture PB2 and outputting the speech, and then proceeds to reproducing the track #5 for displaying the moving picture PB3 and outputting the speech. These moving pictures and the speech represent the moving picture and speech of the senior course.

If, when the menu picture PB1 based upon the first selection list S1 is displayed, the user inputs the alternative number 3 for the junior course, the reproducing device reproduces the list indicated on the selection #3 offset in the selection list S1, that is the play list P5.

In the play list P5, there is recorded "6" as PIN #1, that is the track #6 is designated, while there is recorded "7" as PIN #2, that is the track #7 is designated. Thus the reproducing device first reproduces the track #6, in executing the play list P5, for displaying the moving picture PB4 and outputting the speech. The reproducing device then proceeds to reproducing the track #7 for displaying the moving picture PB5 and outputting the speech. These moving pictures and the speech represent the moving picture and speech of the junior course.

The previous list offset, next list offset and the return list offset may be recorded in the play list and the selection list, as explained previously. A default list offset and a timeout list offset may also be recorded in the selection list. Based on these offsets, the reproducing device is able to advance or recede the list responsive to the user's operation.

If 0004h, for example, is recorded as the previous list offset in the play list P1, and the user executes a previous operation during execution of the play list P1, the reproducing device returns to the selection list S2 whose offset is 0004h, that is the offset byte 0020h.

Thus a video CD may be designed as a simplified interactive type software by playback control. By this function, the video CD may be used in a wide range of applications for education, game or electronic publication besides music and motion picture.

III. Illustrative Construction of Reproducing Apparatus

1. Appearance

A video CD player for reproducing the video CD, according to the present invention, is now explained.

This video CD player is provided with a so-called changer for selectively reproducing five video Cds or CD-DAs.

Figure 23:
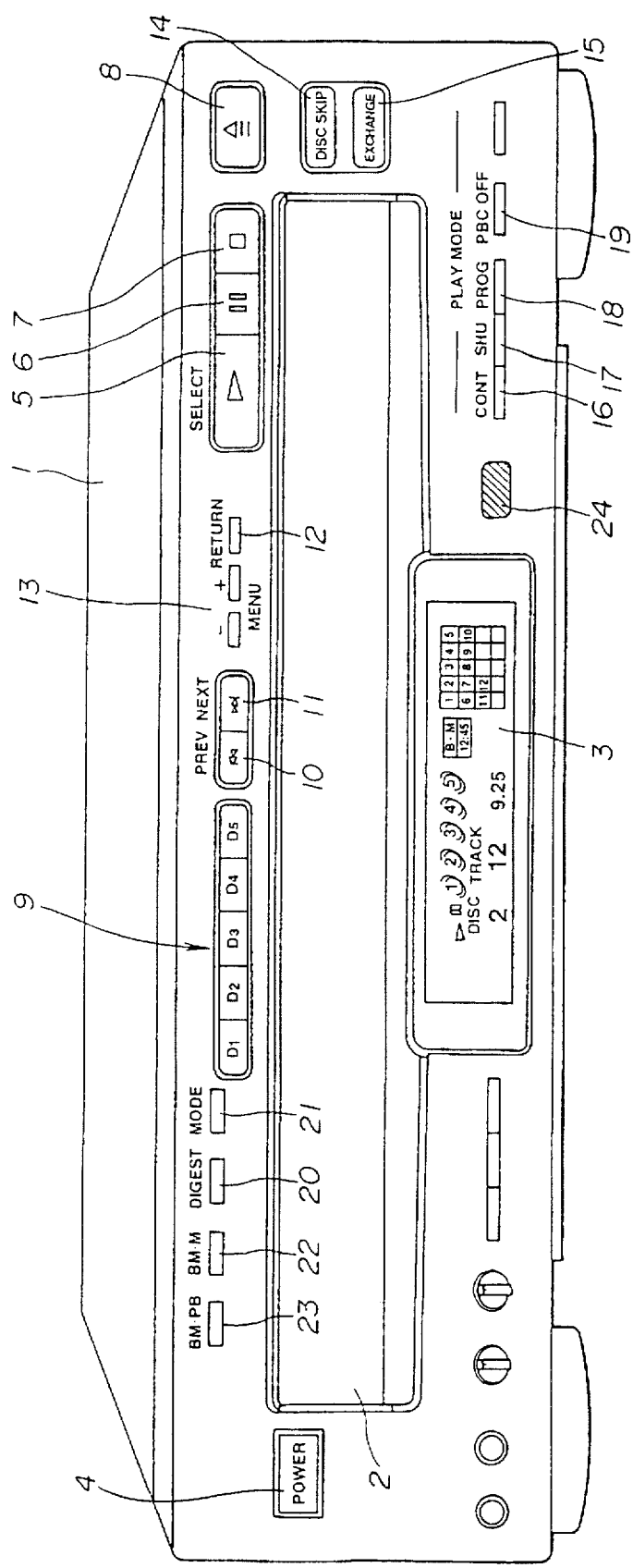
FIG. 23 shows the appearance of a reproducing apparatus embodying the present invention.
Figure 24:
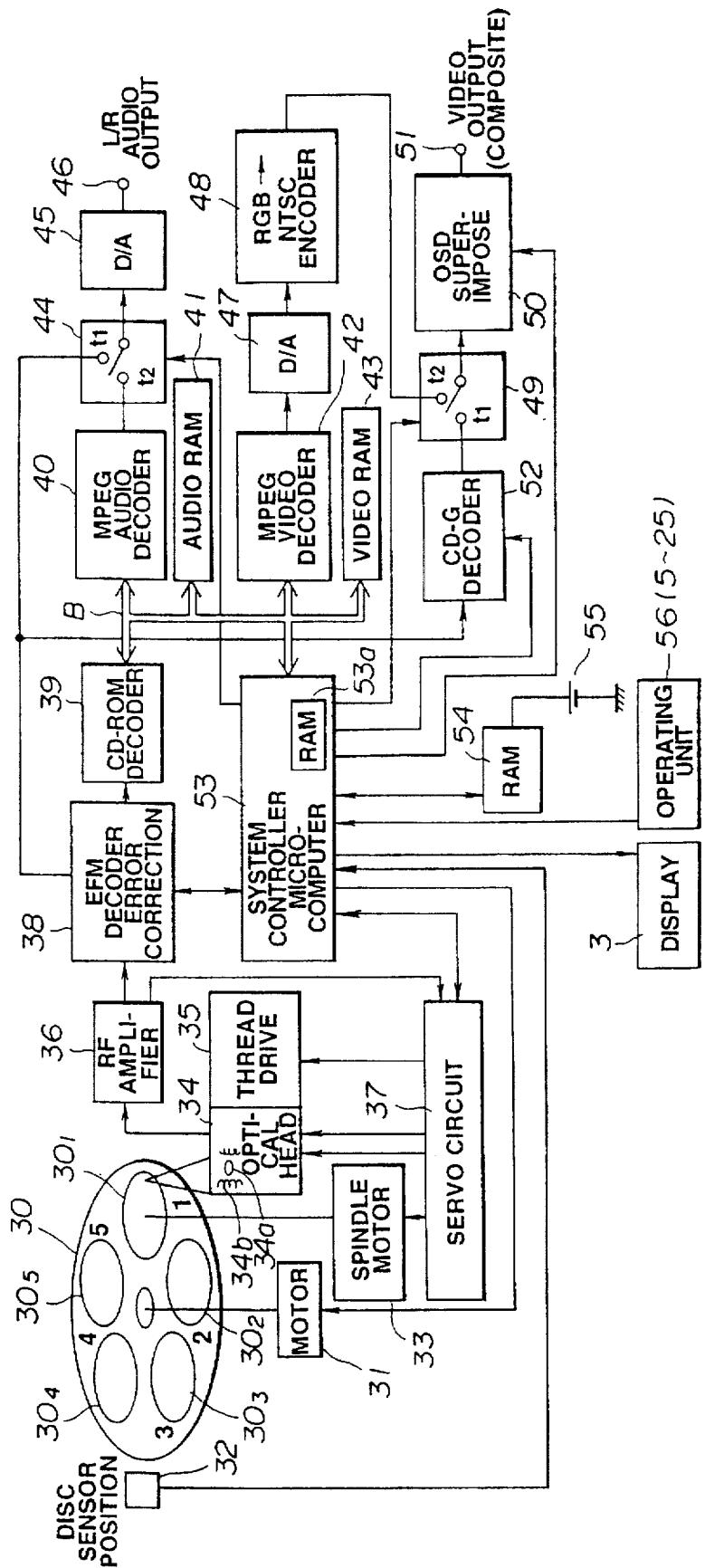
FIG. 24 is a block diagram of the reproducing apparatus shown in FIG. 23.

This video CD player has a disc loader 2 provided on a front panel of a main body 1 and designed for drawing out a disc tray 30 on its front side, as shown for example in FIG. 23. The disc tray 30 has five loading positions $30_1$ to $30_5$, as shown for example in FIG. 24. In these five loading positions $30_1$ to $30_5$, optical discs may be placed horizontally and rotated like roulette for selecting the optical disc to be reproduced.

A display section 3 is provided on the front panel of the main body 1. The display section 3 is formed e.g., by a liquid crystal panel and indicates the operating state and the mode of the video CD play, the number or the play time of the selected optical disc and so forth.

On the front panel are mounted a variety of keys actuated by the user. Specifically, a power on/off key 4, a playback key 5, a pause key 6, a stop key 7 and an ejection key 8 are provided. The playback key 5 is also used as a selection key for performing the above-mentioned playback control operation.

A disc selection key 9 is provided on the front panel. The disc selection key 9 has five keys D1 to D5 associated with the loading positions $30_1$ to $30_5$ of the disc tray 30, respectively. If, for example, the key D1 is pressed, the optical disc loaded at the loading position $30_1$ of the disc tray is loaded on the position of an optical head 34 as later described for reproducing the optical disc.

On the front panel, a rear locating key 10 and a front locating key 11 are provided for automatic music sensor (AMS) operation. The front locating key 10 is a locating key in a direction of the decreasing track number, while the rear locating key 11 is a locating key in a direction of the increasing track number. The rear locating key 10 is also used as a previous key for the previous operation during the above-mentioned playback control operation. The front locating key 11 is also used as a next key for the next operation during the above-mentioned playback control operation.

A return key 12 is provided on the front panel and is used for a return operation during the playback control operation.

A +/− selection key 13 is provided on the front panel so as to be used for a selection operation on the menu screen during playback control. That is, the alternative number selection is performed using the +/− key 13 on the menu screen and, at a time point when a certain alternative number is selected, the selecting operation is performed using the playback key 5 for completing the menu selection.

On the front panel, there are provided a disc skip key 14, a disc exchange key 15, a normal playback mode key 16, a shuffle playback mode key 17, a program playback mode key 18 and a PBC off key 19. The normal playback mode key 16 to the PBC off key 19 are play mode selection keys. When the video CD having the playback control function is to be reproduced, the normal playback mode key 16 is pressed, whereby the video CD player automatically enters the playback control operation. If, during the playback control operation, the PBC off key 19 is pressed, the video CD player transfers from the menu playback operation of the PBC mode to the normal playback operation. That is, the PBC off key 19 is a key used for turning off the PBC mode.

A digest key 20 and a digest mode key 21 are provided on the front panel. The digest key 20 is used for displaying the digest concerning accommodated optical discs. The digest mode key 21 enables selection as to whether the digest picture concerning the video CD having the playback control function is to be a menu picture or an in-track picture.

A book mark registration key 22 and a book mark reproducing key 23 are provided on the front panel. The reproducing point, referred to hereinafter as a book mark point, is registered by the user pressing the book mark registration key 22 during reproduction. Reproduction may proceed beginning from the book mark point by pressing the book mark reproducing key 23. Five book mark points, for example, may be designated and registered for a single optical disc by the book mark registration key 22.

If, after pressing the book mark reproducing key 23, the user selects one of the registered book mark points, reproduction is started from the selected point. The +/− selection key 13 and the reproducing key 5, for example, are employed for selecting the registered book mark point.

An infra-red reception unit 24 is provided on the front panel. The infra-red reception unit 24 receives a command signal transmitted from e.g., a remote commander, not shown, and transmits the command signal as the operating information to a system controller 53 as later explained. 2. Illustrative Circuit construction Referring to FIG. 24, the vide CD player includes a motor 31 for rotationally driving the disc tray 30, a disc position sensor 32 for detecting which of the loading positions $30_1$ to $30_5$ on the disc tray is at the position of an optical head 34, a spindle motor 33 for rotationally driving the optical disc, the optical head 34 for reproducing the information, such as video data, from the optical disc, a thread mechanism 35 for driving the optical head 34 along the radius of the disc, an RF amplifier 36 for amplifying playback RF signals from the optical head 34 and for generating tracking error signals or the like, a servo circuit 37 for effecting tracking control for the optical head 34 based upon tracking error signals from the RF amplifier 36, a decoding unit (decoder) 38 for demodulating playback RF signals from the RF amplifier 36, a CD-ROM decoder 39 for decoding the information from the decoding unit 38 in accordance with the CD-ROM format, an MPEG audio decoder 40 for decoding audio data from the CD-ROM decoder 39, an audio RAM 41 for transiently storing the audio data, an MPEG video decoder 42 for decoding video data from the CD-ROM decoder 39, a video RAM 43 for transiently storing the video data, a changeover switch for selectively switching between audio data from the decoding unit 38 and that from the MPEG audio decoding unit 40, a D/A converter 45 for converting audio data from the changeover switch 44 into analog audio data, a D/A converter 47 for converting video data from the MPEG video decoder 42 into red (R), green (G) and blue (B) video signals, an RGB/NTSC encoder 48 for converting the video signal from the D/A converter 47 into composite video signals, a changeover switch 49 for selectively switching between composite video signals from the RGB/NTSC encoder 48 and from a CD-G decoder 52, an OSD processing unit 50 for effecting superimposing display, the CD-G decoder 52 for converting still picture data from the decoder 38 into composite video signals, a system controller 53 for controlling the above-mentioned respective circuits based upon the playback control information from the CD-ROM decoder 39, a RAM 54 for storing the results of processing by the system controller 53, a back-up power source 55 for supplying the current to the RAM 54, and an operating unit 56 comprised of the above-mentioned operating keys 5 to 23.

The disc tray 30, having the five loading positions $30^1$ to $30_5$, for enabling the loading of the five optical discs, is run into rotation by the motor 31 so that one of the loading positions is sent to the position of the optical head 34 by the motor rotation. That is, the optical disc loaded on the loading position 30 is loaded on the position of the optical head 34. The disc position sensor 32 detects which of the loading positions 30 is at the position of the optical head 34 and sends the results of detection to the system controller 53.

The loaded optical disc is chucked and then run in rotation by the spindle motor 33. The optical disc is illuminated by the optical head 34 with the laser light, as the disc is rotated, so that the information is read by the reflected light.

Specifically, the optical head 34 is provided with an optical system comprised e.g., of a laser diode, a polarized beam splitter or an objective lens 34a, and a detector for detecting the reflected light. The objective lens 34a is held by a so-called biaxial mechanism 34b for displacement in a direction along the radius of the optical disc and in a direction along the optical axis of the disc. The optical head 34 is also driven by the thread mechanism along the radius of the disc.

The optical head 34 detects playback RF signals responsive to the information, such as audio data, recorded on the optical disc, and sends the detected signals to the RF amplifier 36. The RF amplifier 36 amplifies playback RF signals and processes detector outputs for generating tracking error signals and focusing error signals. The amplified playback RF signals are sent to the decoding unit 38, while the tracking error signals and the focusing error signals are sent to the servo circuit 37.

The servo circuit 37 generates various servo driving signals, based upon the tracking error signal and the focusing error signals supplied from the RF amplifier 36, track jump commands and access commands sent from the system controller 53 and the rotational speed detection information for the spindle motor 33 and controls the biaxial mechanism 34b and the thread mechanism 35 by these servo driving signals for effecting focusing control and tracking control. The servo circuit 37 also controls the spindle motor 33 so that the optical disc will be rotated at a constant linear velocity.

The decoding unit 38 converts the playback RF signals supplied from the RF amplifier 36 into bi-level signals for reproducing the audio and video data, while correcting the data for errors by error correction processing employing EFM (eight-fourteen demodulation) or CIRC (cross interleaved Reed-Solomon code). If the optical disc being reproduced falls under the category of the CD-ROM, exemplified by a video CD, the decoding unit 38 sends the produced audio data and video data to the CD-ROM decoder 39. If the optical disc being reproduced is the CD-DA, the produced audio data is sent to the changeover switch 44, while the video data is sent to the CD-G decoder 52. The decoding unit 38 sends the reproduced P and Q channel sub-code data to the system controller 53.

If the optical disc being reproduced is e.g., a video CD, the CD-ROM decoder 39 decodes the audio data and the video data supplied from the decoding unit 38 in accordance with the CD-ROM format. The audio data and the video data, decoded by the CD-ROM decoder 39, are sent to the MPEG audio decoder 40 and the MPEG video decoder 42, respectively. Of the information decoded by the MPEG decoder 39, the disc information of various sorts, such as the information for the above-mentioned playback control, is sent to the system controller 53 so as to be transiently stored in a RAM 53a of the controller 53.

The MPEG audio decoder 40 decodes audio data supplied from the CD-ROM decoder 39, at a pre-set timing, using the audio RAM 41, and sends the decoded audio data to the changeover switch 44.

The changeover switch 44 is such a changeover switch which is changed over responsive to the sorts of the optical disc being reproduced under control by the system controller 53. If the optical disc being reproduced is the CD-DA, the audio data, decoded by the EFM demodulation and error correction, is obtained by the decoder 38. Thus, during the CD-DA reproduction, the system controller 53 connects the selection terminal of the changeover switch 44 to a terminal t1. This sends the audio data from the decoder 38 to the D/A converter 45. The D/A decoder 45 converts the audio data into analog audio signals which are outputted via an audio output terminal 46 to a downstream side external equipment, such as a monitor unit.

On the other hand, if the optical disc being reproduced is the video CD, the audio data is obtained from the MPEG audio decoder 40. Thus, during reproduction of the video CD, the system controller 53 causes the selection terminal of the changeover switch 44 to be connected to a terminal t2. This causes audio data from the MPEG audio decoder 40 to be sent to the D/A converter 45. The D/A converter 45 converts the audio data into audio signals which are outputted via an audio output terminal 46 to the external equipment.

The MPEG video decoder 42 decodes the video data supplied from the CD-ROM decoder 39, during reproduction of the video CD, using the video RAM 43, and transmits the resulting RGB video data to the D/A converter 47.

The D/A converter 47 converts the video data supplied from the MPEG video decoder 42 into analog signals and transmits the resulting RGB video signals to the RGB/NTSC encoder 48. The RGB/NTSC encoder 48 converts the RGB video signals into composite video signals of the NTSC system and sends the resulting signals to the terminal t2 of the changeover switch 49.

The changeover switch 49 is also such a changeover switch which is changed over responsive to the sorts of the reproduced optical disc under control by the system controller 53. If the video CD is reproduced, the RGB video data is obtained from the MPEG video decoder 42 as the playback data of the optical disc. Thus, during reproduction of the video CD, the system controller 53 causes the selection terminal of the changeover switch 49 to the terminal t2, so that the changeover switch 49 allows the composite video signals from the RGB/NTSC encoder 48 to be supplied to the OSD processing unit 50. The OSD processing unit 50 performs preset superimposing processing on the composite video signals under instructions by the system controller 53 and sends the processed signals via a video output terminal 51 to an external equipment, such as a monitoring unit.

If the optical disc being reproduced is the CD-DA and especially a CD-G, still picture data (video data of the still picture) are read out from the R to W sub-code channels of the optical disc. Thus the CD-G decoder 52 decodes still picture data supplied from the decoding unit 38 to transmit the resulting composite video signals of the NTSC system (still picture) to the terminal t1 of the changeover switch 49. During reproduction of the CD-DA, the system controller 53 causes the selection terminal of the changeover switch 49 to be connected to the terminal t1. The changeover switch 49 causes the composite video signal from the CD-DA decoder 52 to be supplied via the OSD processing unit 50 and the video output terminal 51 to the external equipment.

The RAM 54 has memory data backed up by the backup power source 55. In the RAM 54, data which should not be lost on power down, such as registered data of the book mark points, are stored. An EEP-ROM, for example, may naturally be employed in place of the RAM 54.

The operating unit 56 is equivalent to the operating keys 5 to 23 shown in FIG. 23 and to the IR reception unit 24 (with the remote commander) and sends a signal responsive to the user's operation to the system controller 53. For reproducing the optical disc, managemental data stored on the optical disc, that is the TOC or the sub-code data, is read out, while the system controller 53 is responsive to the managemental data supplied form the decoder 38 for displaying the playback time on the display unit 3.

IV. Random Reproducing Operation during PBC Operation

With the conventional reproducing device, such as the CD player, the program of a number corresponding to the random number generated by the internal random number generator is reproduced when the user presses a operating bouton commanding random reproduction. However, the conventional reproducing device has such drawbacks that the program reproduction is not automatically performed in the absence of actuation by the user, the reproduced programs are reproduced twice or more, or the program reproducing sequences tend to be the same for the first random reproduction and the second random reproduction, thus suffering from insipidity in the reproducing sequences. The vide CD player of the instant embodiment is designed so that, in such random program reproduction, program selection will be made ubiquitously.

The operation is hereinafter explained.

Figure 25:
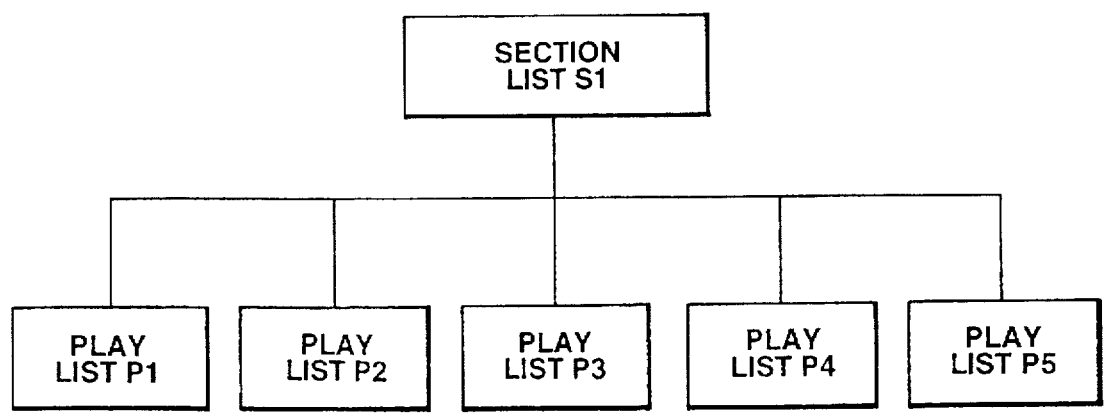
FIG. 25 illustrates a list structure for illustrating the random selecting operation of the reproducing apparatus shown in FIG. 23.
Figure 26:
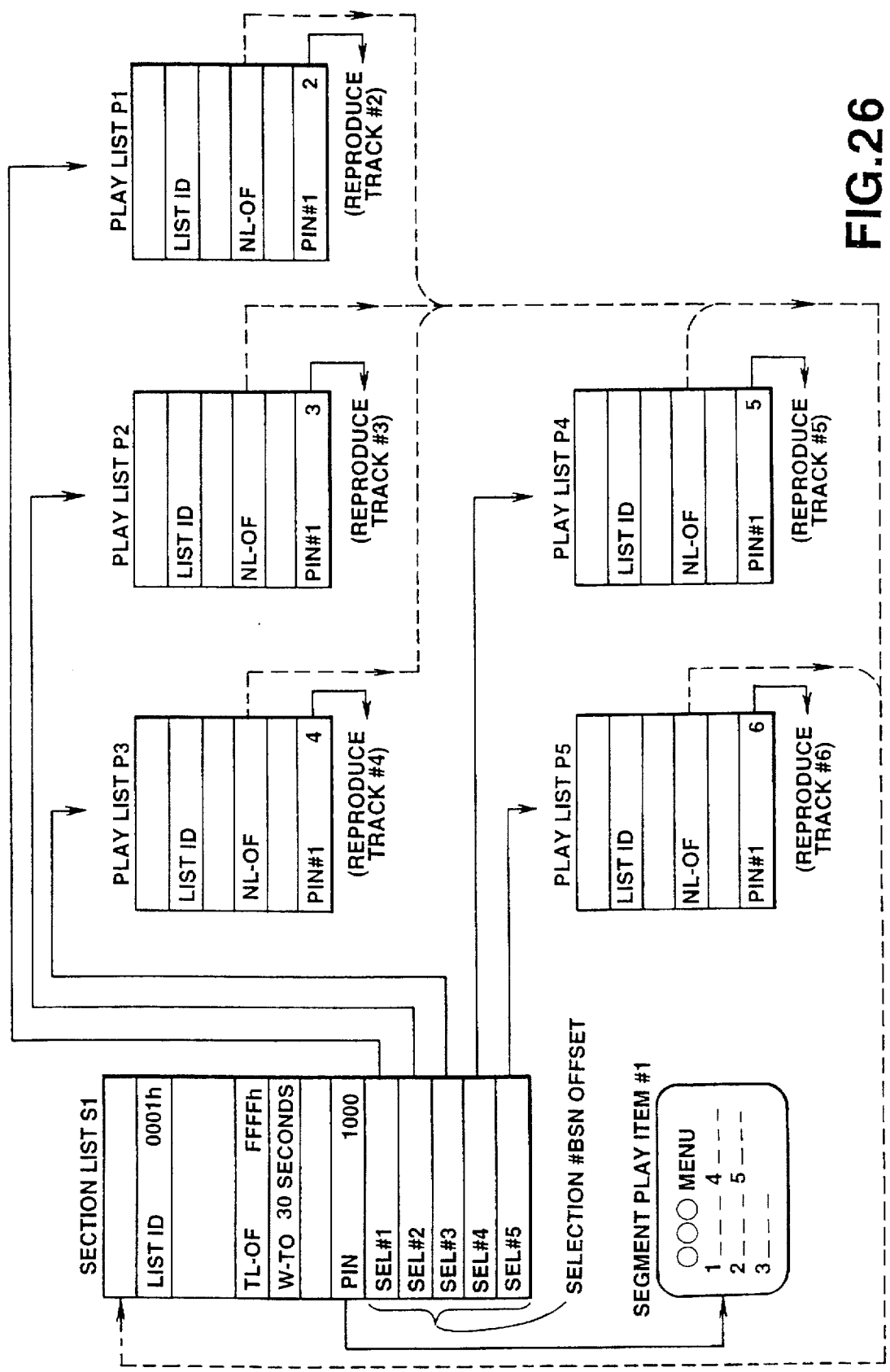
FIG. 26 illustrates another list structure for illustrating the random selecting operation of the reproducing apparatus shown in FIG. 23.

The playback control operation has been explained above by referring to illustrative examples shown in FIGS. 21 and 22. For explanation sake, a directory of a simple list structure shown in FIG. 25 is now used. That is, it is assumed that five alternatives are provided for the selection list S1 and five play lists P1 to P5 are designated by the respective alternatives. FIG. 26 shows this directory taking the representation of FIG. 22 into account.

It is assumed that the list ID for the selection list S1 is 0001h, and that FFFFh is entered in the selection list S1 as the timeout list offset (TL-OF) explained in connection with FIG. 19, thus specifying that random alternative selection be made responsive to the timeout. It is also assumed that the value of the wait time until timeout (W-TO) is 30, that is the standby time of 30 seconds is designated. It is also assumed that Sel#1 to Sel#5 are provided as selection #BSN offset, such that there are five alternatives, and that Sel#1 to Sel#5 designate the play lists P1 to P5, respectively.

It is also assumed that, in the play list P1, the track (program) #2 has been designated as the play item number PIN #1. It is similarly assumed that, as the play item numbers PIN #1, the track #3, track #4, track #5 and the track #6 are designated in the play list P2, play list P3, play list P4 and in the play list P5, respectively.

It is also assumed that, in all of the play lists P1 to P5, the selection list S1 is designated as the next list offset (NL-OF), that is that, if the reproducing operation for the track designated by the respective play lists comes to a close, the operation is returned to the selection list S1.

In such list structure, if the time of 30 seconds has elapsed at the time point the selection list S1 is in operation, without the user performing any operation, one of the play lists P1 to P5 is randomly selected. The track designated by the selected play list is reproduced and, when the reproduction of the track comes to a close, the operation reverts to the selection list S1. If again the time of 30 seconds has elapsed without the user performing any operation, one of the lay lists P1 to P5 is selected at random.

Figure 27:
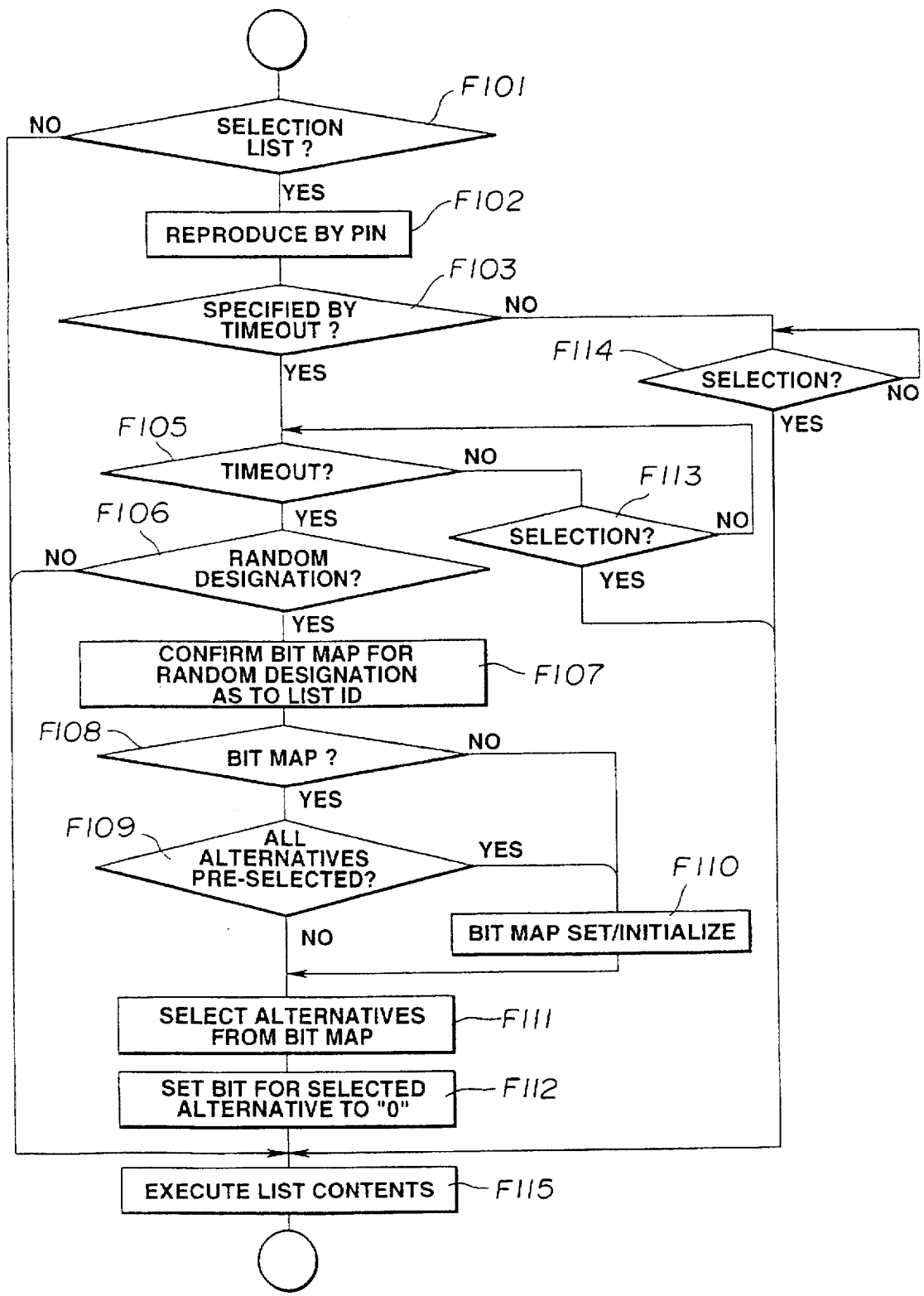
FIG. 27 is a flow chart for illustrating the processing for realization of the random selecting operation of the reproducing apparatus shown in FIG. 23.

Taking the list structure as an example, the control operation of the system controller 53 during the reproduction of a program (track) is explained by referring to FIG. 27.

In the playback control operation, the system controller 53 judges at step F101 whether the list is the selection list S1. If the result of judgment is YES, the system controller transfers to step F102 and, if otherwise, the system controller transfers to step F115.

At step F102, the system controller 53 performs reproduction based upon the play item number (PIN) of the selection list, before transferring to step F103. Specifically, in the example of FIG. 26, the play item number PIN of the selection list S1 is 1000. The system controller 53 then causes the segment play item #1 to be reproduced and displays the menu having five alternatives to be displayed as shown in FIG. 26.

At step F103, the system controller 53 judges whether timeout is designated in the selection list S1. If the result of judgement is YES, the system controller transfers to step F105 and, if otherwise, the system controller transfers to step F114. Specifically, if the value of the wait time (W-TO) until timeout is FFh, timeout designation is not made. Thus the system controller 53 transfers to step F114 and is at a stand-by state until a selection operation is performed by the user. That is, the menu is continued to be displayed until an input is made by the user. If the user performs the selecting operation at step F114, the system controller 53 transfers to step F115 and performs the reproducing operation responsive to the selected play list or to the lower-layer selection list.

On the other hand, if the value of the wait time until timeout in the selection list S1 is 01h to FEh, timeout designation is made, so that the system controller 53 transfers to step F105. In the example of FIG. 26, the time of 30 seconds is set in the selection list S1.

At step F105, the system controller 53 has e.g., an internal timer, and compares the timer value and the wait time value to each other to judge whether or not the timeout is reached. If the result of judgment is YES, the system controller transfers to step F106 and, if otherwise, to step F113.

At step F113, the system controller 53 judges whether or not the user has made the selecting operation. If the result of judgment is YES, the system controller transfers to step F115 and, if otherwise, the system controller reverts to step F105. Specifically, if the user selects the alternative 2 before the time of 30 seconds has elapsed, the system controller 53 transfers to step F115 for carrying out the list contents. That is, the system controller 53 transfers to the play list P2 by the alternative 2, that is Sel#2, and executes reproduction of the track #3 designated as PIN #1.

Conversely, if no operation is done at step F105 until timeout, the system controller 53 judges whether or not random designation has been made. If the result of judgement is YES, the system controller transfers to step F107 and, if otherwise, the system controller transfers to step F115. Specifically, if the timeout list offset (TL-OF) is FFFh, random designation is made. Meanwhile, if the list set as timeout list offset (TL-OF) is designated, the designation is not random designation. The system controller 53 transfers to step F115 in order to execute the reproducing operation by the designated list. In the example of FIG. 26, random designation has been made.

At step F107, the system controller 53 confirms the bit map for random designation as to the selection list S1 before transferring to step F108. The bit map for random designation is such a bit map which the system controller 53 forms and holds in the RAM 53a. Specifically, the system controller 53 provides an area in which to store the list ID in the RAM 53a, as shown for example in FIG. 28A. The system controller then provides an area of 1 bit associated with Sel#1 to Sel#99. That is, the system controller 53 provides an area for 99 bits corresponding to the number of alternatives that can be set in the selection list. This area can be constituted by a 13-byte area. The system controller 53 forms a bit map in association with a selection list.

At step F108, the system controller 53 judges whether or not the bit map for random designation, to which is appended the list ID of the current selection list, is stored in the RAM 53a. If the result of judgment is YES, the system controller transfers to step F109. If otherwise, that is if the system controller has not transferred in the past in the course of the operation concerning the selection list to the processing downstream of the step F107, the system controller 53 transfers to step F110.

At step F110, the system controller 53 provides a bit map for random designation in the RAM 53a and subsequently initializes the bit map for random designation. The system controller then transfers to step F111. Specifically, the system controller 53 provides an area in the RAM 53a, as shown for example in FIG. 28A, and performs initialization for setting the bit associated with the stored alternative to 1. In the selection list S1 of FIG. 26, since Sel#1 to Sel#5 are present as alternatives, the five bits corresponding thereto are set to 1, as shown for example in FIG. 28B, by way of initializing the bit map for random designation. The bit map for random designation may also be stored in the RAM 54.

At step F111, the system controller 53 randomly selects one of the bits in the bit map for random designation set to 1, before transferring to step F112. Specifically, the system controller 53 randomly selects an alternative from among Sel#1 to Sel#5, using a numerical figure generated by a M-series generator or a random generator.

At step F112, the system controller 53 sets the bit for the selected alternative to 0, before transferring to step F115. At this step F115, the system controller 53 executes the list contents corresponding to the alternative.

If Sel#2, for example, is selected at step F111, the bit corresponding to Sel#2 is set to 0 at step F112, as shown for example in FIG. 28C. Then, at step F115, the contents of the play list P2, that is the reproduction of the track #3, is carried out.

If the reproduction of the track #3, that is the contents of the play list P2, comes to a close, the system controller 53 reverts to the selection list S1, in the example of FIG. 26, that is transfers from step F101 to step F102, for displaying the menu.

If the user does not perform any selecting operation, the system controller 53 transfers to step F107 after lapse of 30 seconds. In such case, there is already stored in the RAM 53a the bit map for random designation associated with the selection list S1. Thus the system controller 53 transfers from step F108 to step F109.

At step F109, the system controller 53 judges whether or not all alternatives have been selected in the random designating operation in the past. If the result of judgment is YES, the system controller transfers to step F111 and, if otherwise, the system controller transfers to step F110. Specifically, since the bits associated with the selected bits are set to 0, the system controller judges whether or not all bits of from Sel#1 to Sel#99 of the bit map for random designation are zero. If only the bit associated with Sel#2 is zero, as shown for example in FIG. 28C, only Sel#2 has been selected in the past, so that the system controller 53 transfers to step F111. At step F111, the system controller 53 performs random selection of Sel#1 based upon the bit map for random designation. Specifically, the system controller 53 selects one alternative from among the alternatives whose bits are 1. That is, in the case shown in FIG. 28C, the system controller 53 eliminates Sel#2 and selects Sel#1.

If Sel#4 is selected at step F111, the bit associated with Sel#4 is set to 0 (step F112). The track #5 is then reproduced by the play list P4 (step F1F115).

The same holds for the subsequent operations, that is, if the random selection operation is executed for the selection list S1, random selection is made from among alternatives whose bits in the bit map for random selection at this time point are "1".

At the time point when selection has been made through Sel#1 to Sel#5 by the random selection operation, the state of bit map for random selection is such that all bits are 0 as shown for example in FIG. 28E. If the processing in the system controller 53 transfers in this state to step F108 ff., processing proceeds from step F109 to F110 where initialization again is performed. That is, the state of the bit map for random designation is that shown in FIG. 28B. The processing at steps F111 proceeds in a similar manner.

With the instant embodiment, if random selection is performed in a given selection list, the state of past selection is stored by the bit map for random selection, and selection is made from among the unselected programs, so that it becomes possible to prohibit the same contents from being selected repeatedly.

If the bit map for random selection is stored in the RAM 53a, the respective lists may be ubiquitously selected by random selection during the time interval which elapses since the power up until power down. In addition, if the bit map for random selection is stored in the RAM 54, the state of past selection may be confirmed for selection without regard to the power on/off.

The present invention is not limited to the above-described embodiments, but may be employed in a variety of reproducing devices. The processing example is also not limited to that shown in FIG. 27. For example, the step F103 of judging as to presence or absence of timeout designation and the step F105 of timeout judgment may be omitted from FIG. 27 so that it is judged only whether or not random designation has been made.

INDUSTRIAL APPLICABILITY

It will be seen from the foregoing that, when reproducing the program from a recording medium having a plurality of programs recorded therein and a management area in which alternatives for selecting the programs in reproducing the programs are recorded as the managemental information, there is previously recorded an identifier for determining the program reproducing mode in the managemental area of the recording medium. This managemental information is reproduced from the managemental area and the reproducing mode is identified based upon the identifier contained in the managemental information. If the reproducing mode is judged to be the random reproduction, the alternatives are selected based upon the generated random number and the program corresponding to the selected alternative is reproduced by way of performing automatic random reproduction.

Also, according to the present invention, when reproducing the program from the recording medium having the program area having plural programs recorded therein and the managemental area having recorded therein program selecting alternatives for program selection in reproducing the program, an identifier for determining the program reproducing mode and the limit time are previously recorded in the managemental area of the recording medium, and the managemental information is reproduced from the managemental area. The limit time contained in the managemental information is compared to the count value in a counter. If the count value exceeds the limit time, the reproducing mode is judged based upon the identifier contained in the managemental information. If the reproducing mode is judged to be random reproduction, the alternative selection is made based upon the generated random number, and the program corresponding to the selected alternative is reproduced for automatically performing random reproduction.

I claim:

1. A reproducing apparatus for reproducing data from a recording medium, said recording medium having a program area including a plurality of programs recorded therein and a management area including management information recorded therein, said management information including a plurality of selection alternatives and a mode identifier, each said selection alternative specifying reproduction of at least one of said programs, and said mode identifier specifying the mode of program reproduction, said apparatus comprising:

reproducing means for reproducing at least one of said programs from the program area of said recording medium and for reproducing at least a portion of said management information from said management area, said reproduced portion including said mode identifier;

judgment means for judging the mode of program reproduction based upon said reproduced mode identifier;

random number generating means for generating a random number;

selection means for selecting one of said selection alternatives based upon said random number if the mode of program reproduction judged by said judgement means is random reproduction; and control means for controlling the reproducing means to reproduce at least one program specified by the selection alternative selected by said selection means.

2. A reproducing apparatus for reproducing data from a recording medium said recording medium having a program area including a plurality of programs recorded therein and a management area including management information recorded therein, said management information including a plurality of selection alternatives, a mode identifier and a time limit, each said selection alternative specifying reproduction of at least one of said programs, and said mode identifier specifying the mode of program reproduction, said apparatus comprising:

reproducing means for reproducing at least one of said programs from the program area of said recording medium and for reproducing at least a portion of said management information from said management area, said reproduced portion including said mode identifier and said time limit;

time measurement means for measuring a period of time prior to said reproducing of at least one of said programs;

judgment means for judging the mode of program reproduction based upon said reproduced mode identifier when said time period exceeds said time limit;

random number generating means for generating a random number;

selection means for selecting one of said selection alternatives based upon said random number if the mode of program reproduction judged by said judgement means is random reproduction; and control means for controlling the reproducing means to reproduce at least one program specified by the selection alternative selected by said selection means.

3. The reproducing apparatus as claimed in claim 2 wherein said selection means includes storage means for storing an indication of said selected one of said selection alternatives, and wherein, when performing repeated selections based upon the random number a selection alternative other than one of the selection alternatives indicated in the storage means is selected.

4. A reproducing method for reproducing data from a recording medium, said recording medium having a program area including a plurality of programs recorded therein and a management area including management information recorded therein, said management information including a plurality of selection alternatives and a mode identifier, each said selection alternative specifying reproduction of at least one of said programs, and said mode identifier specifying the mode of program reproduction, said method comprising the steps of:

reproducing at least a portion of said management information from said management area, said reproduced portion including said mode identifier, and judging the mode of program reproduction based upon said reproduced mode identifier;

selecting one of said selection alternatives based upon a generated random number if the mode of program reproduction is judged to be a random reproduction in said judgment step; and reproducing at least one program specified by said selection alternative selected in said selecting step.

5. A reproducing method for reproducing data from a recording medium, said recording medium having a program area including a plurality of programs recorded therein and a management area including management information recorded therein, said management information including a plurality of selection alternatives, a mode identifier and a time limit, each said selection alternative specifying reproduction of at least one of said programs, and said mode identifier specifying the mode of program reproduction, said method comprising the steps of:

reproducing at least a portion of said management information from said management area, said reproduced portion including said mode identifier and said time limit, and comparing said time limit to a count value of a counter;

judging the mode of program reproduction based upon said mode identifier if said count value exceeds said time limit;

selecting one of said selection alternatives based upon a generated random number if the mode of program reproduction is judged to be a random reproduction in said judgment step; and reproducing at least one program specified by said selection alternative selected in said selecting step.

6. The reproducing method as claimed in claim 5, further comprising the step of storing an indication of said selected one of said selection alternatives in a storage means; and wherein, when performing repeated selections based upon said random number a selection alternative other than one of the selection alternatives indicated in the storage means is selected.

7. A recording medium having a program area including a plurality of programs recorded therein, and a management area including management information recorded therein, wherein said management information includes a mode identifier for identifying whether continuous reproduction or random reproduction based upon random numbers is to be performed by way of program reproduction.

8. The recording medium as claimed in claim 7 wherein said management information includes a time limit which compared to a period of time preceding reproduction of at least one of said programs, said random reproduction being performed in accordance with said identifier when said time period exceeds said time limit.

9. A recording medium having a program area including a plurality of programs recorded therein, and a management area including management information recorded therein, said management information including a mode identifier for identifying whether continuous reproduction or random reproduction based upon random numbers is to be performed by way of program reproduction, and said management information further including a time limit which is compared to a period of time preceding reproduction of at least one of said programs, wherein said random reproduction is performed in accordance with said mode identifier when said time period exceeds said time limit.

* * * * *